US006647430B1

(12) United States Patent
Minyard et al.

(10) Patent No.: US 6,647,430 B1
(45) Date of Patent: Nov. 11, 2003

(54) GEOGRAPHICALLY SEPARATED TOTEM RINGS

(75) Inventors: Trenton Corey Minyard, Richardson, TX (US); Gregory T. Stovall, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/364,792

(22) Filed: Jul. 30, 1999

(51) Int. Cl.[7] .............................................. G06F 15/16
(52) U.S. Cl. ....................... 709/251; 709/246; 370/397; 370/401
(58) Field of Search ................................ 709/251, 246; 370/397, 401

(56) References Cited

U.S. PATENT DOCUMENTS

| | | | | |
|---|---|---|---|---|
| 5,619,650 A | * | 4/1997 | Bach et al. | 709/246 |
| 5,818,842 A | * | 10/1998 | Burwell et al. | 370/397 |
| 6,115,776 A | * | 9/2000 | Reid et al. | 710/260 |
| 6,122,281 A | * | 9/2000 | Donovan et al. | 370/401 |

OTHER PUBLICATIONS

Amir, Y., et al., "The Totem Single–Ring Ordering and Membership Protocol," *ACM Transactions on Computer Systems* (1995).
Hennessy, John L. & Patterson, David A., "Interconnection Networks and Clusters," *Computer Architecture A Quantitative Approach*; Chapter 8, p. 832; Third Edition (2003); Morgan Kaufmann Publishers, Amsterdam.
UDP, searchnetworking.com.
"LAN Data Link Layer Protocols," Chapter 21, pp. 327–352; ANSI/IEEE 802.5 1995–00.
Butterfly–Glossary, http://www.cnuce.pi.cnr.it/Glossario/GlossarioT.html.
Token ring, searchnetworking.com.
FDDI, www.pmg.comotw nwsl/97 sm fddi.htm.
FDDI, searchnetworking.com.
ATM, searchnetworking.com.
ATM and ISO–OSI Reference Model, www.usc.edu/dept/engineering/eleceng/Adv Network Tech/Html/telcosld022.htm.
OSI, searchnetworking.com.
Agarwal, Deborah A., "Totem: A Reliable Ordered Delivery Protocol for Interconnected Local–Area Networks," a dissertation submitted in partial satisfaction of the requirements for the Degree of Doctor of Philosophy in Electrical and Computer Engineering, University of California (Aug. 1994).
Powell, David, "Group Communication," *Communications of the ACM*, pp. 50–53, vol. 39, No. 4 (Apr. 1996).
Moser, L.E. et al., "Totem: A Fault–Tolerant Multicast Group Communication System," *Communications of the ACM*, pp. 54–63, vol. 39, No. 4 (Apr. 1996).

\* cited by examiner

*Primary Examiner*—Frantz Jean
(74) *Attorney, Agent, or Firm*—Carr LLP

(57) ABSTRACT

A Totem ring network (100) includes Totem rings (102, 104) which are geographically separated by relatively long distances. Time latencies between the geographically separated Totem rings (102, 104) are minimized by providing each Totem ring with a dedicated router (122, 132) located geographically proximate to a respective Totem ring. Each router (122, 132) is joined together through point-to-point links (106, 108), and each server (124, 126, 128, 132, 134, 136) on a local area network (120, 130) of a respective ring (102, 104) is joined to the respective Totem ring (102, 104) and router (122, 132).

59 Claims, 24 Drawing Sheets

| EVENT | EVENT NAME | DESCRIPTION OF EVENT |
|---|---|---|
| 600 | ring-comes-up | Receipt of a signal from the ring layer indicating that the LAN is operational |
| 602 | connection-ack-from-remote-router | Receipt of a signal from the point-to-point capable network indicating that a connection has been made with a remote router |
| 604 | connection-lost-to-remote-router | Receipt of a signal from the point-to-point capable network indicating that a connection to a remote router has failed |
| 606 | remote-ring-up-from-remote-router | Receipt of a message by a local router from a remote router reporting that a ring served by the remote router has become operational |
| 608 | remote-ring-fail-from-remote-router | Receipt of a message from a remote router reporting that a ring served by the remote router has failed |
| 610 | ring-fails | Receipt of a signal from the ring layer indicating that a LAN has failed |
| 612 | timestamp-timeout | Receipt of a signal from the clock indicating that a timestamp has not been sent to a specific remote router for a period of time |
| 614 | message-from-ring | Receipt of a signal indicating that a data message has been received from the LAN |
| 616 | message-from-a-remote-router | Receipt of a signal indicating that a data message has been received from a remote router |
| 618 | timestamp-message-from-a-remote-router | Receipt of a signal indicating that a timestamp message has been received from a remote router |
| 620 | router-ready-request-from-ring | Receipt of a message from a server on a LAN requesting to know whether a router on the LAN is ready |
| 650 | enable-ring | Receipt of a signal directing the ring layer to start the procedure to bring a LAN into service |
| 652 | connect | Receipt of a signal directing the point-to-point capable network to start the connection process to a remote router |
| 656 | ring-up | Receipt of a message from a remote router or LAN reporting that a ring served by the remote router or which resides on the LAN is ready for normal operation |
| 658 | ring-fail | Receipt of a message from a remote router or LAN reporting that a ring served by the remote router or which resides on the LAN has failed and is no longer operational |
| 660 | router-ready | Receipt of a message from a router reporting to LANs served by the router that the router is ready for operation |
| 662 | system-ring-failure | Receipt of a message that is broadcast to all servers to inform all servers in the system that a ring has failed |

*Fig. 6*

GEOGRAPHICALLY SEPARATED TOTEM RINGS

TECHNICAL FIELD

The invention relates generally to communication systems and, more particularly, to a system and method for interconnecting Totem rings geographically separated by relatively long-distances.

BACKGROUND

A number of systems have been developed for providing network communications among groups of users. One such system comprises a Totem ring network in which a plurality of host processors, referred to herein as Totem servers, are connected to a bus network. Each Totem server includes circuitry for interfacing with the Totem ring network (e.g., sending and receiving messages on the Totem ring network), and a Central Processing Unit (CPU) adapted for executing processes comprising application programs effective for managing call processing, database operations, industrial control, and the like.

A Totem ring network provides for multicast delivery of messages, wherein messages may be transmitted and delivered to multiple locations, and ensures that the sequence in which messages are generated is maintained as such messages are transmitted and delivered throughout the system. Totem ring. networks are considered to be well-known to those skilled in the art and are described in greater detail in various technical papers and articles, such as an article entitled "Totem: A Fault Tolerant Multicast Group Communication System" by L. E. Moser et al., published in the April 1996, Vol. 39, No. 4 Edition of Communications of the ACM (Association for Computing Machinery).

Typically, Totem ring networks provide for totally ordered multicasting of messages over a single local area network (LAN), or multiple LANs in close proximity which are interconnected by devices referred to as gateways. Gateways, like routers in other network configurations, can be configured to function as Totem servers, described above, and are also effective for receiving communication packets on multiple interfaces and forwarding them to one or more destination interfaces. Gateways are typically configured with an off-the-shelf CPU and associated hardware and software which enable the gateway to interface with rings to which the gateway is connected.

The aforementioned sequence of messages and totally ordered multicasting of messages over a Totem ring network is maintained by protocols which attach timestamps and sequence numbers to each message. Errors are identified when such timestamps or sequence numbers are identified as being out of order.

Typically, a gateway on a Totem ring network forwards all messages it receives from one ring to all other rings to which it is connected, unless any such message has already been delivered to any such other ring. A drawback with Totem ring networks is that when Totem rings are geographically separated over long distances, as in wide area networks (WAN), at least one Totem ring must span a long distance, such as a mile or several hundreds of miles. The span of a single Totem ring over such long distances results in time latencies (such as a few tens of nanoseconds, or more) between servers on the Totem ring, which are sufficiently long to result in undesirable, and in many cases unacceptable, error rates on Totem rings. It can be appreciated, then, that time latencies limit the geographic size, and hence the capacity and utility, of Totem networks. Furthermore, as the operational speed of Totem ring networks increases in the future, such networks will become less tolerant to time latencies, thereby further limiting the geographic size, capacity, and utility of Totem networks.

Accordingly, a continuing search has been directed to the development of methods and systems which may enable Totem rings interconnected through a Totem ring network to be geographically separated over long distances without experiencing degradations in performance which result from long time latencies.

SUMMARY

The present invention, accordingly, provides a Totem ring network with Totem rings which may be geographically separated by relatively long distances without experiencing degradations in performance. Time latencies between the geographically separated Totem rings are minimized by providing each of the geographically separated Totem rings with a router, and providing at least one point-to-point link interconnecting together the respective routers.

The present invention also provides a method for joining the geographically separated Totem rings of the Totem ring network by joining together, via at least one point-to-point link, the routers of the respective Totem rings.

The use of the present invention eliminates unacceptable latency time and resultant error rates between Totem rings which are separated by relatively long geographic distances. Thus, the geographic size, speed, capacity, and utility of Totem networks is significantly increased without incurring degradations in performance which result from long time latencies.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 depicts representative events associated with the present invention;

DESCRIPTION

Figure 1:
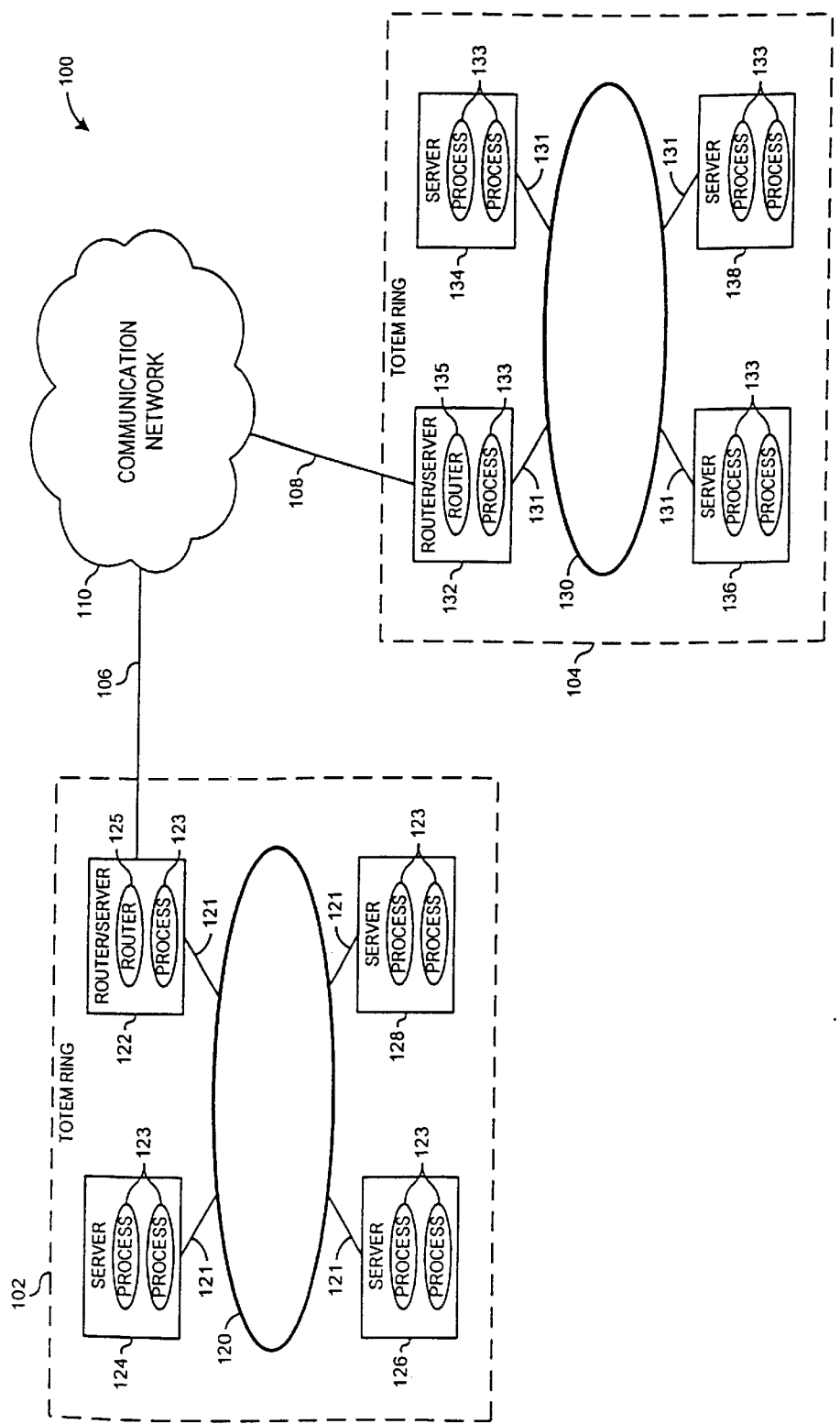
FIG. 1 is a schematic diagram depicting two Totem rings interconnected for communicating with each other through Totem routers which embody features of the present invention.

Referring to FIG. 1 of the drawings, the reference numeral 100 generally designates a Totem ring network embodying features of the present invention. The Totem ring network 100 is a virtual synchrony system comprising a first Totem ring 102 and a second Totem ring 104 interconnected together via a first point-to-point communications link 106 and a second point-to-point communications link 108 through a communications network 110, such as a wide area network (WAN), considered to be well-known in the art.

As exemplified in FIG. 1, the first Totem ring 102 comprises a local area network (LAN) 120 through which four Totem servers 122, 124, 126, and 128 are interconnected via links 121. As similarly exemplified, the second Totem ring 104 comprises LAN 130 through which four Totem servers 132, 134, 136, and 138 are interconnected via links 131. While only two Totem rings 102 and 104 are depicted in FIG. 1 as being interconnected, it is understood that more than two Totem rings 102 and 104 may be so interconnected. Furthermore, more or less than four Totem servers may be interconnected on each of the Totem rings 102 and 104.

Each of the servers 122, 124, 126, and 128 comprise at least one process 123, and each of the servers 132, 134, 136, and 138 comprise at least one process 133, which processes are effective for providing server functions and for managing programs for such applications as call processing, database operations, industrial control, and the like. Within each of the servers 122 and 132 are special system processes, designated by the reference numerals 125 and 135, respectively, which function as Totem routers for interfacing the respective Totem rings 102 and 104 with the communication network 110. Because the servers 122 and 132 function as both servers and routers, they will, hereinafter, be generally referred to herein as Totem routers 122 and 132, respectively.

Each of the servers 122, 124, 126, and 128 provide an interface between the LAN 120 and devices (not shown) served by the respective servers on the LAN 120. Similarly, each of the servers 132, 134, 136, and 138 provide an interface between the LAN 130 and devices served by the respective servers on the LAN 130.

Each router 122 and 132 is, additionally, effective for performing point-to-point routing communications via the point-to-point communication links 106 and 108 and the communications network 110. To maintain such point-to-point communications, the links 106 and 108 preferably comprise reliable, sequenced point-to-point links to the network 110, and preferably automatically disconnect, in a manner well-known in the art, when connectivity to a destination process fails. The links 106 and 108 may utilize transmission control protocol/internet protocol (TCP/IP), or a standard network interface such as the Ethernet or Asynchronous Transport Mode (ATM), or the like.

As used herein with reference to a ring, server, or router within a specific Totem ring, the term "local" is used in the conventional sense to refer to the ring, a server, or a router operatively connected within the specific Totem ring, and the term "remote" is used in the conventional sense to refer to any ring, server, or router not operatively connected within the specific Totem ring.

Figure 2:
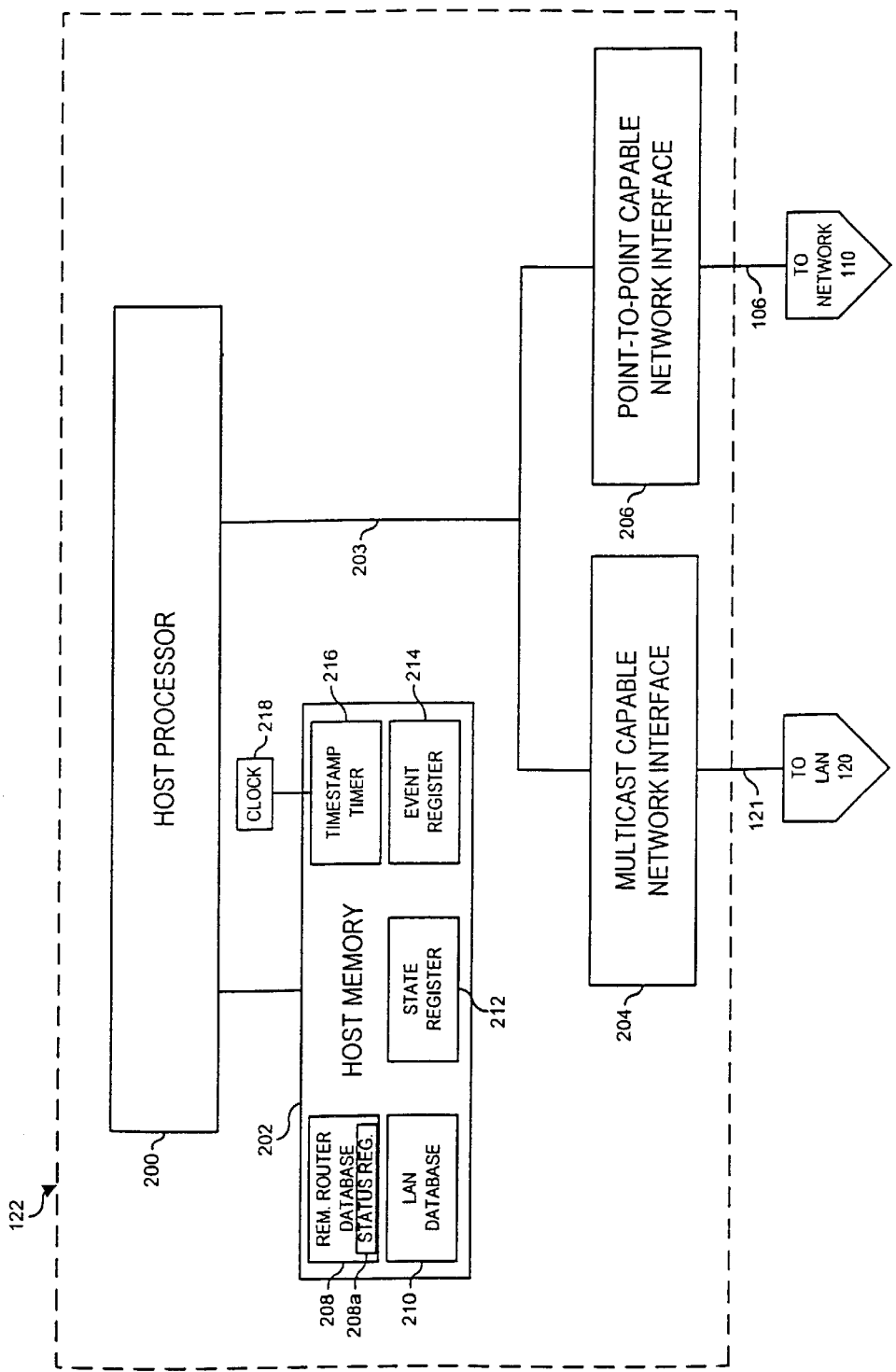
FIG. 2 is a conceptual block diagram of a Totem router of FIG. 1.

The routers 122 and 132 are substantially identical to each other, in a functional sense, and, for the sake of conciseness, are depicted representatively in FIG. 2 by the router 122. As depicted therein and described further below, the router 122 comprises a host processor 200, such as a conventional microprocessor or central processing unit (CPU). As described further below, the host processor 200 is connected in a conventional manner to a host memory 202, and is connected through a conventional computer interface 203, such as a personal computer interface (PCI) bus, or the like, to at least two interface devices 204 and 206.

The host memory 202 comprises conventional memory components, such as random access memory (RAM) and a hard disk memory (not shown). As discussed in further detail below, the host memory 202 is apportioned between a remote router database 208, a LAN database 210, a state register 212, an event register 214, and a timestamp register 216. A clock 218 is connected to the timestamp register 216. The router database 208 records the address of each remote router 132 (only one of which is shown in FIG. 1) of each LAN 130 (only one of which is shown in FIG. 1) existing within the Totem ring network 100 (FIG. 1). The router database 208 includes a status register 208a that indicates, for the router located at each address recorded in the router database 208, and for each Totem ring served by such respective router, whether the respective router and ring are connected together ("up") or are disconnected ("down"). Information (including router and ring addresses and status) in a specific remote router database is also referred to herein as "remote router info."

The LAN database 210 stores server information for each of the local servers 124, 126, and 128 which interfaces through the LAN 120 with the local router 122, such server information being well-known and including the up/down connection status of each of the local servers 124, 126, and 128. A LAN database 210 is provided for each Totem ring having a local Totem router.

The state register 212 tracks the operating state, described below with respect to FIG. 3, of the local Totem router 122. The event register 214 maintains a record of the status of Totem router events, described below with respect to FIG. 8, that affect the operational state of the local Totem router 122.

The timestamp timer 216 is a software-driven timer which ensures that time, measured by the clock 218, which elapses between the transfer of timestamp messages from the local Totem router 122 to the LAN 120 and remote routers 132, does not exceed a predefined maximum amount of time.

The timestamp messages include timestamp information which conforms to standard requirements for conventional Totem ring protocols.

The multicast-capable network interface 204 comprises a 100BaseT interface device, or the like, effective for providing a multicast and point-to-point interface between the host processor 200 of the router 122, and the, LAN. 120 (FIG. 1) via the link 121. While not shown, additional multicast-capable network interfaces, similar to the interface 204, may be connected to the interface 203 to provide an interface to additional Totem rings (not shown). Each additional Totem ring may then interface with a corresponding LAN of additional Totem servers, to thereby enable a single router to serve more than one Totem ring.

The point-to-point-capable network interface 206 is connected for providing a point-to-point hardware interface between the host memory 202 and the link 106 (FIG. 1) to the communications network 110 (FIG. 1). The point-to-point interface 208 may comprise any of a number of generic, off-the-shelf, industry-standard interfaces, such as 100BaseT, ATM 155, and the like, effective for providing point-to-point WAN interfaces.

Figure 3:
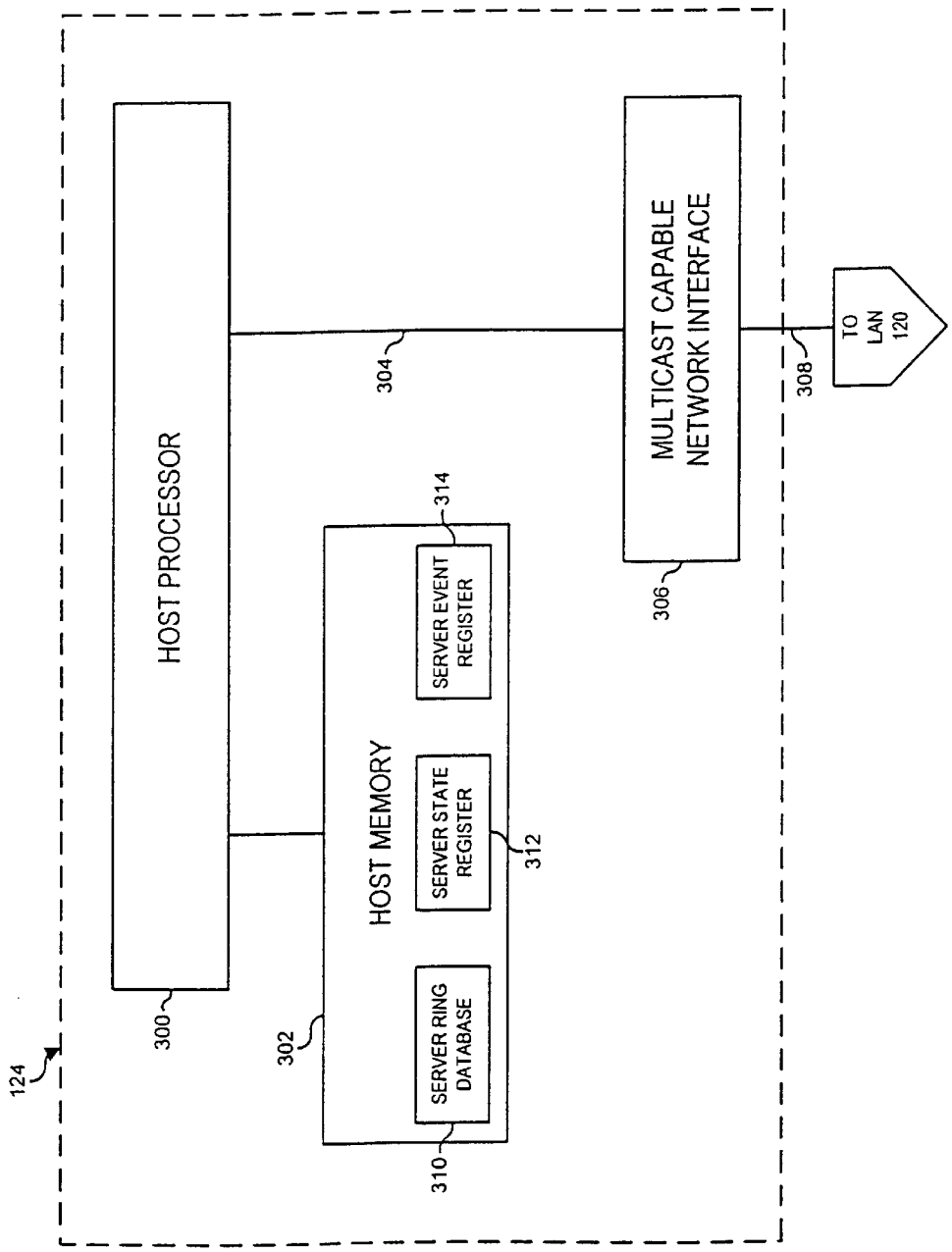
FIG. 3 is a conceptual block diagram of a Totem server of FIG. 1.

FIG. 3 depicts a server 124 of FIG. 1, which server is substantially identical to the servers 126, 128, 134, 136, and 138 and, for the sake of conciseness, are depicted representatively in FIG. 3 by the server 124. Additionally, the routers 122 and 132 may perform standard server operations as well as router operations, and thus may comprise a combination of the router shown in FIG. 2 and the server shown in FIG. 3.

As depicted in FIG. 3 and described further below, the server 124 comprises a host processor 300, such as a conventional microprocessor or central processing unit (CPU). As described further below, the host processor 300 is connected in a conventional manner to a host memory 302, and is connected through a conventional computer interface 304, such as a personal computer interface (PCI) bus, or the like, to at least one interface device 306, such as the multicast capable network interface 204 (FIG. 2), or the like.

The host memory 302 comprises conventional memory components, such as random access memory (RAM) and a hard disk memory (not shown). As discussed in further detail below, the host memory 302 is apportioned between a server ring database 310, a server state register 222, and a server event register 314.

The server ring database 310 records the address of each remote ring 104 (only one of which is shown in FIG. 1). The server state register 312 tracks the operating state, described below with respect to FIG. 13, of the server 124. The server event register 314 maintains a record of the status of server events, described below with respect to FIG. 6, that affect the operational state of the server 124.

Figure 4:
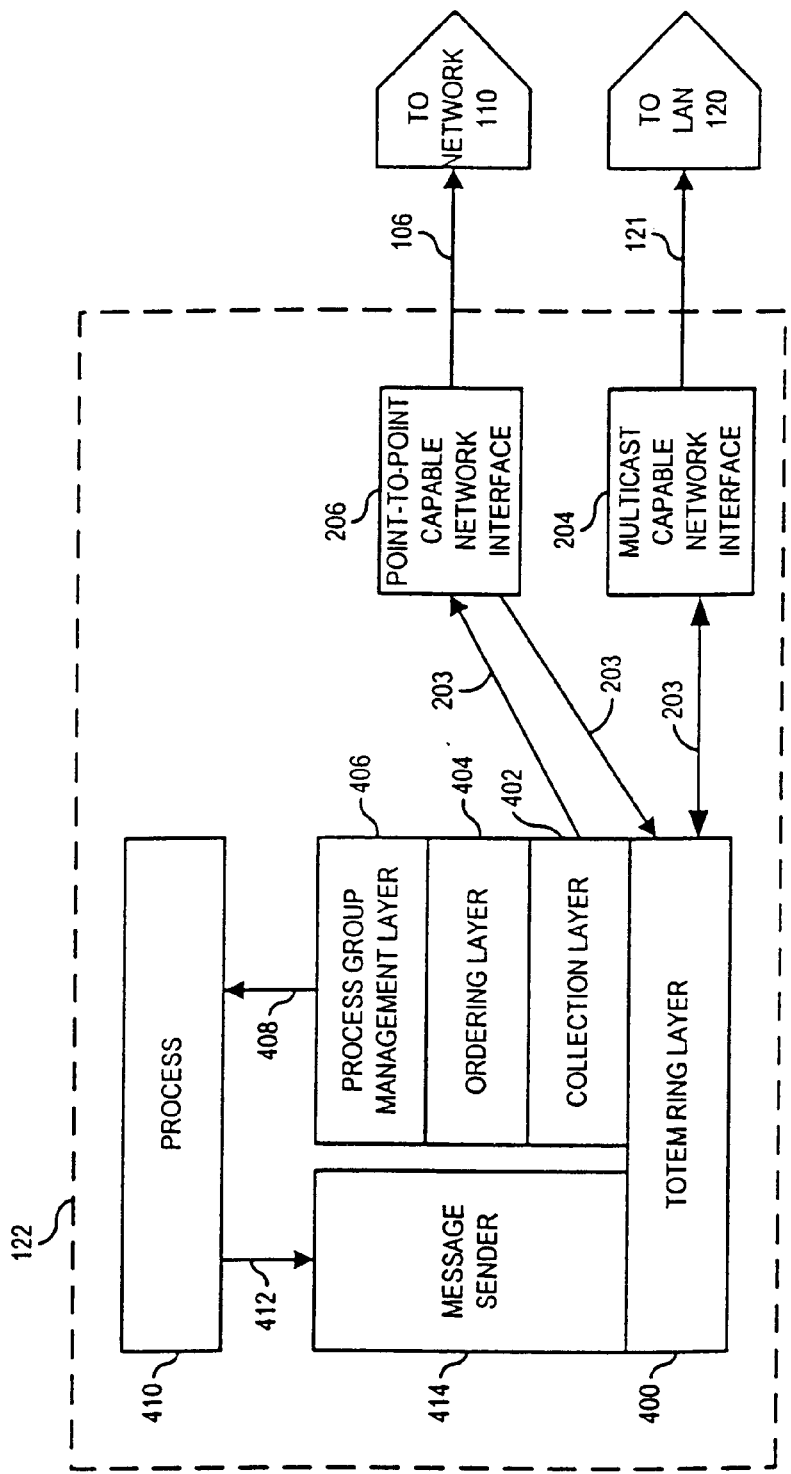
FIG. 4 is a schematic diagram depicting protocol layers associated with the Totem router of FIG. 2 and the Totem server of FIG. 3.

Each Totem router 122 and 132, and each other server 124, 126, 128, 134, 136, and 138, comprises a number of protocol layers which are substantially similar and, for the sake of conciseness, are depicted representatively in FIG. 4 by the protocol layers of the router 122. It is understood that the protocol layers depicted in FIG. 4 represent an abstraction comprising instructions residing within the host memory 208 (FIG. 2), which instructions are executed by the host processor 200 (FIG. 2).

As depicted in FIG. 4, the router 122 comprises a Totem ring layer 400 preferably configured for receiving and transmitting messages, or packets of messages, in total order to and from the LAN 120 (via the bus 203, interface 204, and link 121), and for receiving messages from the network 110 (via the bus 203, interface 206, and link 106). As discussed further below, the Totem ring layer 400 preferably further interfaces with, and is configured to forward messages it receives to, an optional collection layer 402 or, alternatively, directly to an ordering layer 404.

The collection layer 402, while optional, is preferably provided and is configured to accumulate packets, i.e., segments, of a message, received on and transferred from the Totem ring layer 400, until the total message has been accumulated. The collection layer 402 is particularly well-suited for accumulating individual messages which form atomic messages, each of which individual messages are delivered only if all of the individual messages are delivered to all intended destinations. Atomic messages are more fully disclosed and discussed in U.S. patent application Ser. No. 09/252,140, entitled "Atomic Transmission of Multiple Messages in a Virtual Synchrony Environment", filed on Feb. 18, 1999, on behalf of Corey Minyard et al. which is hereby incorporated in its entirety by reference.

The collection layer 402 interfaces with the bus 203, and with the ordering layer 404. Upon-receiving an entire message or an entire atomic message from the Totem ring layer 400, the collection layer 402 determines whether the message originated from within the LAN 120. If the collection layer 402 determines that the message did not originate on the LAN 120, then it forwards the message to the ordering layer 404. Alternatively, if the collection layer 402 determines that the message did originate on the LAN 120, then it forwards the message to all other LANs (i.e., the LAN 130) in the network 100 via the bus 203 and the point-to-point capable network interface 206.

The ordering layer 404 reviews the timestamp on each collected message or atomic message, and orders the messages in a sequential order relative to other messages. The ordering layer 404 interfaces with a process group management layer 406 for transferring ordered messages to the process group management layer. The ordering layer 404 preferably operates in accordance with conventional Totem ring protocols wherein operational and failure messages are processed in total order.

The process group management layer 406 provides an interface between the ordering layer 404 and the process layer 410. The process group management layer 406 manages and coordinates the relationship and interaction of a process 410 residing on the Totem router 122 with other processes, all of which processes are referred to herein as a "process group". The processes of such a process group are generally distributed among selected routers 122 and 132 and servers 124, 126, 128, 134, 136, and 138. According to conventional process group protocol, a message sent to a process group is sent to all processes in such a process group. The process group management layer 406 also facilitates the communication of information and received messages between one process and other processes and process groups in the Totem ring network 100. Still further, the process group management layer 406 manages "join" and "leave" protocolary operations, whereby a process "joins" or "leaves", respectively, a process group. If the process group management layer 406 determines that a message should be transferred to the process 410, then it is so transferred as indicated schematically by the arrow 408.

The process 410 generally comprises an application program configured for processing a message received from the process group management layer 406. Upon receipt of such a message, the process 410 processes. the message and generates a response to a message sender layer 414, as indicated schematically by an arrow 412.

The message sender 414 is configured to apportion messages received from the process layer 410 into packets, and to transfer such packets in sequence to the Totem ring layer 400.

Figure 5:
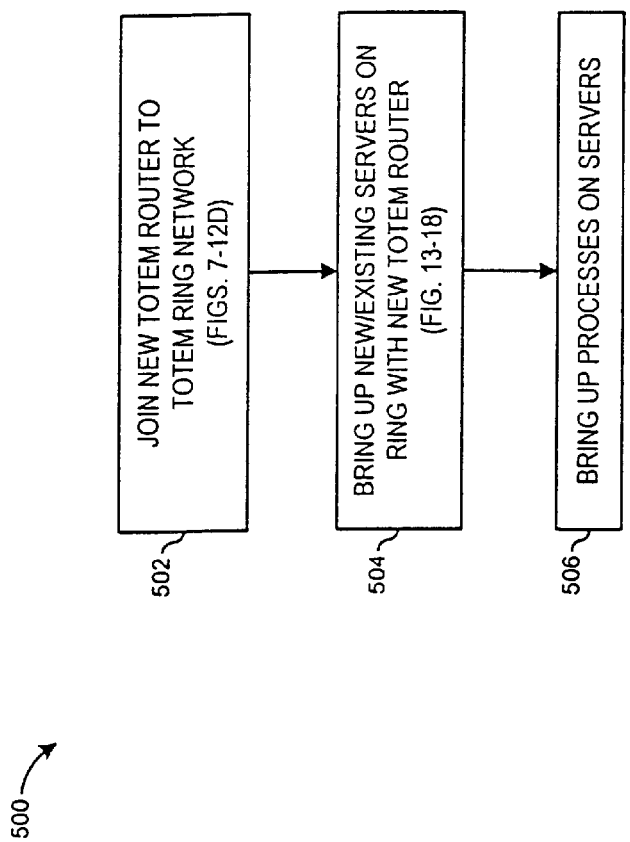
FIG. 5 is a high-level flow diagram summarizing a process embodying features of the present invention for initializing the Totem router, Totem servers, and processes of FIG. 1.

In the implementation of the present invention, once the Totem rings 102 and 104 are physically connected together via the network 110, as described above with respect to FIG. 1, and receive operating power, the Totem rings must also be "joined" together, in a protocolary sense, to thereby establish a communication link between the Totem rings 102 and 104. To that end, FIG. 5 illustrates a flowchart 500 depicting at a high level, and FIGS. 7–18 illustrate flowcharts depicting in greater detail, preferable computer program code (i.e., control logic) implemented by the present invention for joining a new Totem router and its associated ring into a network with one or more other Totem routers and rings in accordance with the present invention.

The computer program code (i.e., control logic) depicted by FIGS. 5 and 7–18 exists in computer programs residing, and is preferably executed from, within the ordering layer 404 of a respective router or server. For the sake of illustration herein of the control logic, and with reference to FIG. 1, the first Totem router 122 and Totem ring 102 will be represented as a new Totem router and ring to be joined through the network 110 to the second ("remote") Totem router 132 and Totem ring 130. While not shown as such, the present invention as described below may also be used to join the Totem router 122 and Totem ring 102 to a Totem network comprising multiple remote Totem routers, each of which Totem routers may serve one or more Totem rings. If a Totem ring network comprises multiple routers and/or multiple rings, then the description provided herein with respect to a single router and/or ring would apply equally to each of the multiple routers and/or rings.

In accordance with step 502 of FIG. 5, the router 122 for the ring 102, is initialized (i.e., powered-up and activated) and joined to the Totem ring network 100 (i.e., to all remote routers 130), as described below with respect to FIGS. 7–12D, thereby also joining the associated LAN 120 to the Totem ring network 100. Upon initialization of the router 122, in step 504, the Totem servers 124, 126, and 128 on the Totem ring 102 are initialized and joined to the network 100. During the step 504, each server identifies itself to all other servers and routers in the network, as described below with respect to FIGS. 13–18.

After each server 122, 124, 126, and 128 has joined the network 100, the one or more processes 123 residing on each server is initiated (i.e., activated) Activation of the processes 123 on the servers 122, 124, 126, and 128 is considered to be well-known in the art and will, therefore, not be discussed in further detail herein.

It is noted that if the Totem ring 102 is the first ring to be initiated in the network 110 (i.e., there are no remote Totem rings 102), then the ring 102 will be unable to come up as described above. In such a case, a special process is executed to inform the router 122 that it is the first router and can proceed without connecting to any remote routers.

FIG. 6 provides a listing and brief description of the general function of each of seventeen possible general sub-processes, or events, 600–662, many of which may be received and/or sent by a Totem router 122 and/or server 124 during the execution of the steps 502 and 504 (FIG. 5). As used herein, the term "events" refers to the receipt of a message or signal. While seventeen events are depicted, the present invention may be implemented with a greater or lesser number of events. The action of the events 600–662 for the Totem router 122 is discussed further below with respect to FIGS. 7–12D. The action of the events 600–662 for the server 124 is discussed further below with respect to FIGS. 13–17.

A ring-comes-up signal 600 indicates that a ring associated with a router is "up" or "in-service". The ring-comes-up event 600 is set following standard Totem ring protocol, when the local Totem ring layer 400 (FIG. 4) reports that it is ready, as described below with respect to FIG. 8.

A connection-ack-from-remote-router signal 602 provides an indication that the remote router 132 is operational and as successfully connected to the router 122.

A connection-lost-to-remote-router signal 604 indicates that a connection between the local router 122 and a non-responding remote router 132 has failed. Such failure is detected and reported by the local point-to-point protocol running on the point-to-point capable network interface 206 in a manner well-known in the art.

A remote-ring-up-from-a-remote-router message 606 occurs when the remote router 132 reports that the LAN 130 (or, if it has more than one ring, any one or more of the rings it serves) has become operational.

A remote-ring-fail-from-remote-router message 608 occurs when the remote router 132 reports that the LAN 130 (or, if it has more than one ring, any one or more of the rings it serves) has failed and is no longer "up" or in-service.

A ring-fails signal 610 indicates that a failure has been detected in a LAN (e.g., the LAN 120) that has previously been up or in service. The failure is determined in accordance with standard Totem ring and server protocol.

A timestamp-timeout signal 612 provides an indication that a timestamp has not been sent to a specific remote router for a system-specified period of time. As described above with respect to FIG. 2, the timestamp timer 216 utilizes a software-controlled clock 218 that tracks the time that elapses between the transfer of timestamp messages to the router 122 and all servers 124, 126, and 128 on a local router's domain. The local router domain comprises all rings (e.g., the LANs 120 and 130) and remote routers (e.g., the router 132), and remote servers (e.g., the servers 134, 136, and 138) that communicate with the local router 122. A timestamp message that is transferred represents information that is well-known in the art and is required for maintaining the total order of messages.

A message-from-ring event 614 indicates that a data message has been received from the LAN 120 that interfaces with the local router 122, and that such message must be routed to other rings (e.g., the LAN 130) and remote routers (e.g., the router 132) unless that message was already forwarded by the router from another ring to this ring. Servers received a message-from-ring event 614. will order and deliver the message according to standard Totem practice.

A message-from-remote-router signal 616 indicates that a data message has been received from a remote router (e.g., the router 132), and that such received data message is to be multicast on all LANs in the LAN database 210 (FIG. 2).

A timestamp-message-from-a-remote-router message 618 indicates that the local router 122 has received a timestamp message from a particular remote router (e.g., the router 132). The receiving local router 122 recognizes such event as an indication that the new timestamp message should be transferred from the remote router 132 to its LANs (e.g., the LAN 130). The remote router 132 timestamp information is used by the local servers 134, 136, and 138 for total ordering of messages in accordance with standard Totem practice.

A router-ready-request-from-ring message 620 is sent when a server 124 on the LAN 120 wants to know if the local router 122 on the LAN 120 is ready for transactions, as depicted in FIG. 6.

An enable-ring signal 650 is generated by a Totem router 122 or a server 124 when it needs to bring the Totem ring layer 400 into service.

A connect signal 652 is generated by a Totem router 122 when it needs to initiate a connection via a point-to-point capable interface to a remote router 132.

A ring-up message 656 is sent by a remote router 132 when a ring 130 comes up that it serves. It is also forwarded by Totem router 122 to the Totem rings it serves (ring 120) when it is received from a remote router 132.

A ring-fail message 658 is sent by a remote router 132 when a ring 130 fails that it serves. It is also forwarded by Totem router 122 to the Totem rings it serves (ring 120) when it is received from a remote router 132.

A router-ready message 660 is sent by a Totem router 122 to a Totem ring 120 that it serves when the Totem router 122 first goes to router-in-server state 716 (FIG. 7) or when a server on the local ring sends a router-ready-request-from-ring 620.

A system-ring-failure message 662 is sent by a Totem router 122 when one of the rings in its LAN database 210 fails. It is also sent by a Totem router 122 when it looses a connection to a remote router 132; in this case one system-ring-failure message 662 is sent for every ring in the remote router database 208 of router 122 that the failed remote router 132 served.

Figure 7:
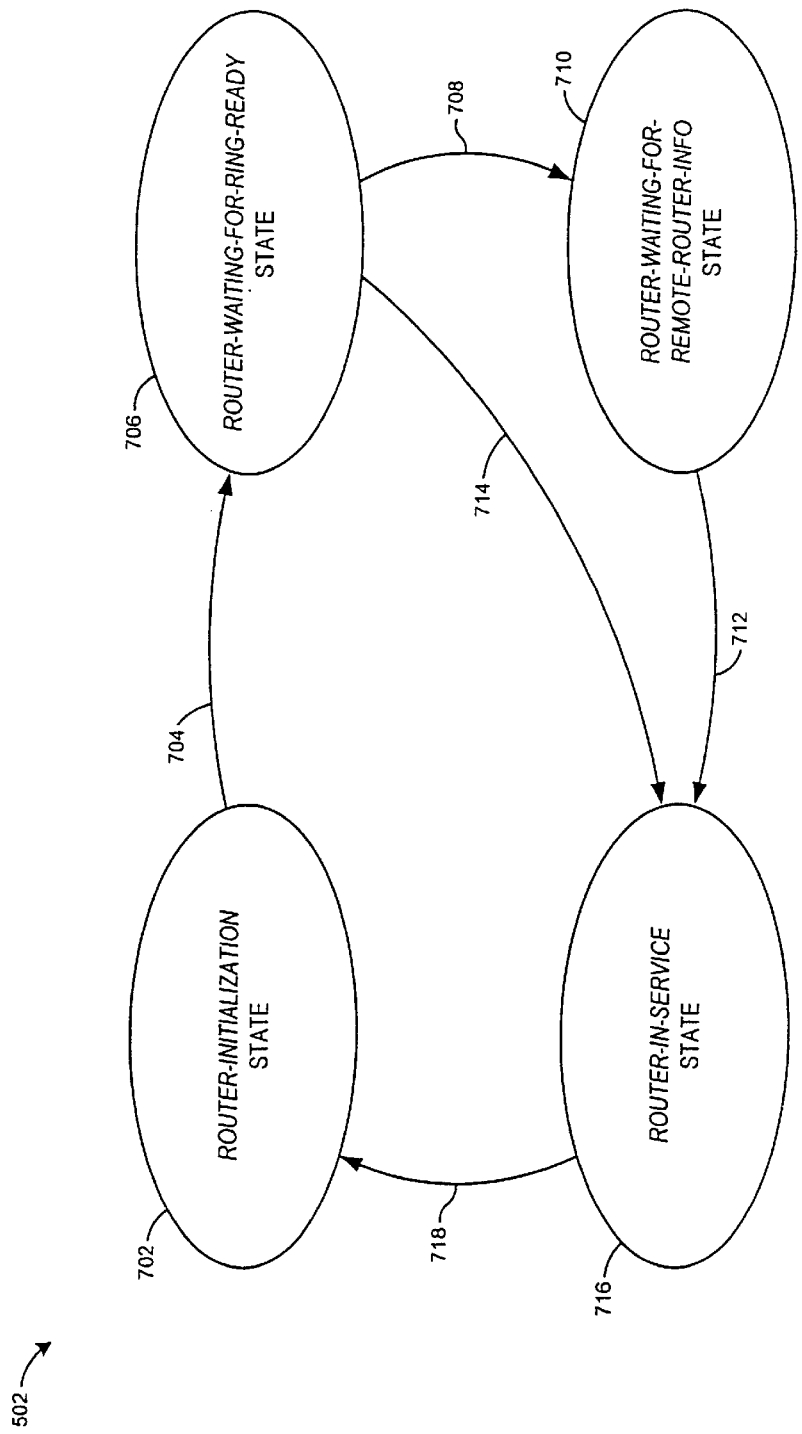
FIG. 7 is a state diagram illustrating four operating states of the router of FIG. 2.

FIG. 7 depicts a state diagram showing four representative general operating states which the router 122 passes through to join the Totem router network 100 in accordance with step 502 (FIG. 5) of the present invention. The operating state is tracked in the state register 212 of the Totem router 122, discussed above.

As depicted in FIG. 7, an initialization state 702 is set in the state register 212 when the Totem router 122 is initially powered on, as may occur following a major router failure, or when standard system maintenance is performed on the router 122 that causes the router to restart its operation. The initialization state 702 is further described below with respect to FIG. 9. Upon completion of the initialization state 702, the router proceeds to a router-waiting-for-ring-ready state 706.

The router 122 remains in the router-waiting-for-ring-ready state 706, described below with respect to FIGS. 10A–10B, until the LAN 120 is ready to receive and process messages, and the remote router 132 is ready for the router 122 and its associated LAN 120 to be joined to the network 110 and to the Totem ring 104.

When the LAN 120 is ready to receive and process messages, and the remote-router 132 is ready for the router 122 and its associated LAN 120 to be joined to the network 110 and to the Totem ring 104, the Totem router 122 determines whether it has received ring information from all remote routers 132, as described below with respect to FIG. 10A. If the router 122 determines that it has received ring information from all remote routers 132, then the router 122 passes from the router-waiting-for-ring-ready state 706 to the router-in-service state 716, as indicated schematically by an arrow 714.

If, while in the state 706, the router 122 determines that it has not received ring information from all remote routers, then the router passes from the router-waiting-for-ring-ready state 706 to a router-waiting-for-remote-router-info state 710, as indicated schematically by an arrow 708, and as described below with respect to FIGS. 11A–11C. The router 122 remains in the router-waiting-for-remote-router-info state 710 until it receives and stores in the remote router database 208 information it requires from the active remote router 132 (and any other routers in the network 100, not shown), or until a failure of a remote router occurs (thereby rendering it unnecessary to receive information about the failed remote router). A failure of the remote router 132 may be identified when the router 122 receives a connection-lost-to-remote-router signal 604 and sets the remote router as disconnected in the database 208. When the router 122 receives and stores the required information about the remote router 132, the router 122 passes from the router-waiting-for-remote-router-info state 710 to the router-in-service state 716, as indicated schematically by an arrow 712.

The router-in-service state 716, described below with respect to FIGS. 12A–12D, is the "normal" operating state for the router 122. While in the router-in-service state 716, the Totem rings 102 and 104 may communicate with each other through their respective routers 122 and 132 and the network 110. The router 122 remains in the router-in-service state 716 until a failure occurs, which may result when no ring information is available in the LAN database 210, or when power to the router 122 is interrupted, at which time the router 122 re-enters the router-initialization state 702, as indicated schematically by an arrow 718.

Router application software (not shown) is located within the host memory 200 (FIG. 2) of the router 122 for execution by the host processor 200 of the router 122 to maintain the status in the event register 214 of the foregoing server states 702, 706, 710, 716 (FIG. 7) by monitoring the Totem router network 100 for the occurrence of various events which represent a change in status. An incoming event from the Totem router network 100 via the link 106 is stored in the event register 214 and is utilized for processing a particular state, and for controlling movement into and out of a particular state.

Figure 8:
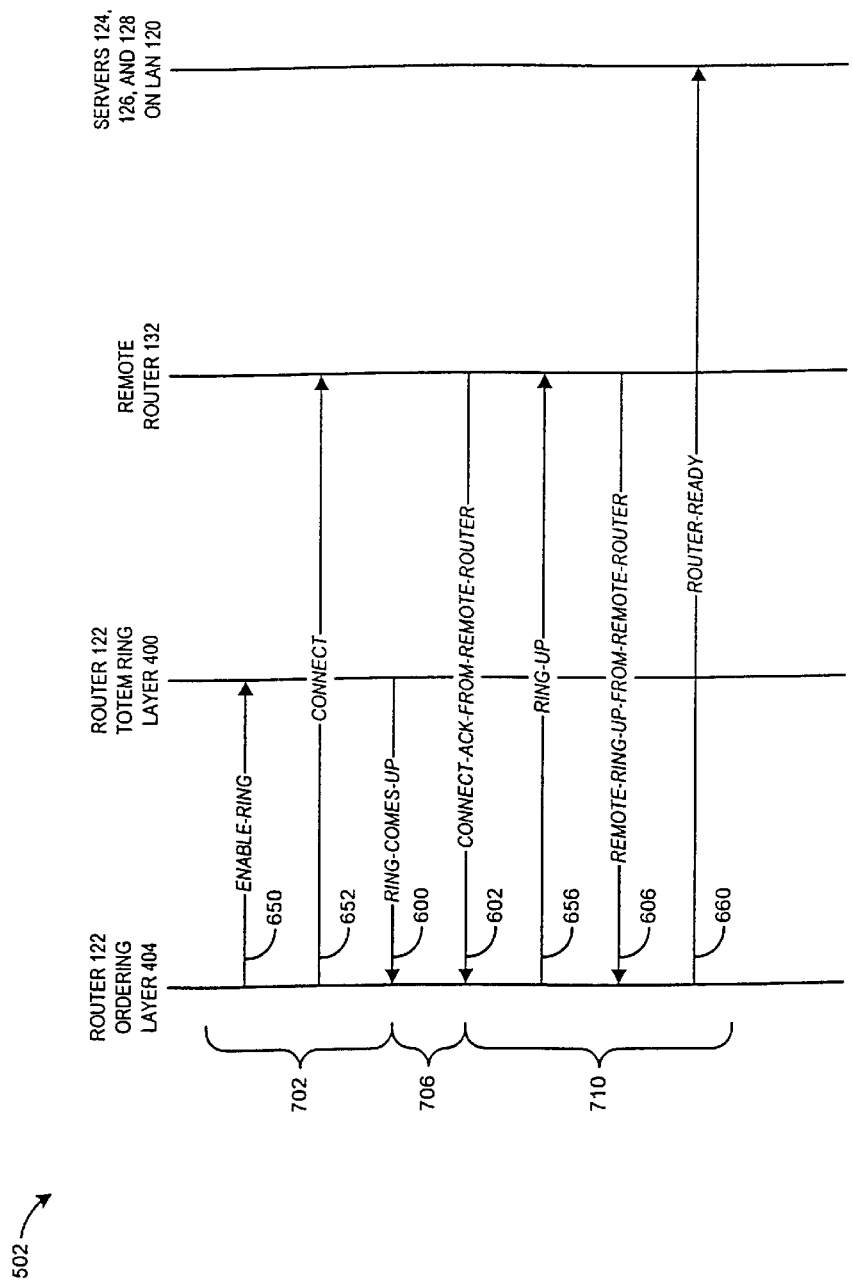
FIG. 8 is a representative message sequence diagram depicting the initialization of the Totem router of FIG. 2.

FIG. 8 depicts a preferred sequence for communicating error-free messages between subsystems in accordance with the present invention. It should be noted, however, that in alternative embodiments, the sequence of messages may differ. It should also be noted that in FIG. 8, events occur timewise from the top of the diagram to the bottom of the diagram.

Accordingly, FIG. 8 illustrates a representative sequence of error-free messages generated for performing step 502 of FIG. 5 to initialize the first ("local") Totem router 122 for communication with the second ("remote") Totem ring 104 via the network 110 and with servers 124, 126, and 128 on the LAN 120. The Totem ring layer 400 represents the Totem LAN layer for the Totem router 122, as described above with respect to FIG. 4.

As shown in FIG. 6, the Totem router 122 sends an enable-ring message 650 to the local Totem ring layer 400 of the local router 122, to determine whether the LAN 120 is ready to receive and process messages. Using the standard protocol for the network 110, the local Totem router 122 sends a point-to-point connect message 652 to remote router 132 in the Totem ring network 100 to indicate that the router 122 is ready to join the Totem ring network 100.

If the LAN 120 is ready to receive and process messages, then in response to the enable-ring message 650, the LAN layer 400 returns a ring-comes-up message 600. In response to the point-to-point connect message 652, the remote router 132 returns a point-to-point connect-ack-from-remote-router message 602, indicating that the remote router 132 has recognized the connect message 652 and is ready for the new Totem router 122 and its associated LAN 120 to be joined to the network 110 and to the Totem ring 104.

In response to the ring-comes-up message 600, and to the point-to-point connection-ack-from-remote-router message 602, the router 122 generates a point-to-point ring-up message 656 to the remote router 132, using standard network protocol. The ring-up message 656 provides information concerning the rings served by the router 122. In response to the ring-up message 656, the remote router 132 returns a point-to-point remote-ring-from-remote-remote router message 606. Once the remote-ring-from-remote-remote router message 606 has been received from the remote Totem router 132, the Totem router 122 multicasts a router-ready message 660, informing the local servers 124, 126, and 128 on the LAN 120 that the router 122 is ready to transfer packets to and from the servers 124, 126, and 128.

Figure 9:
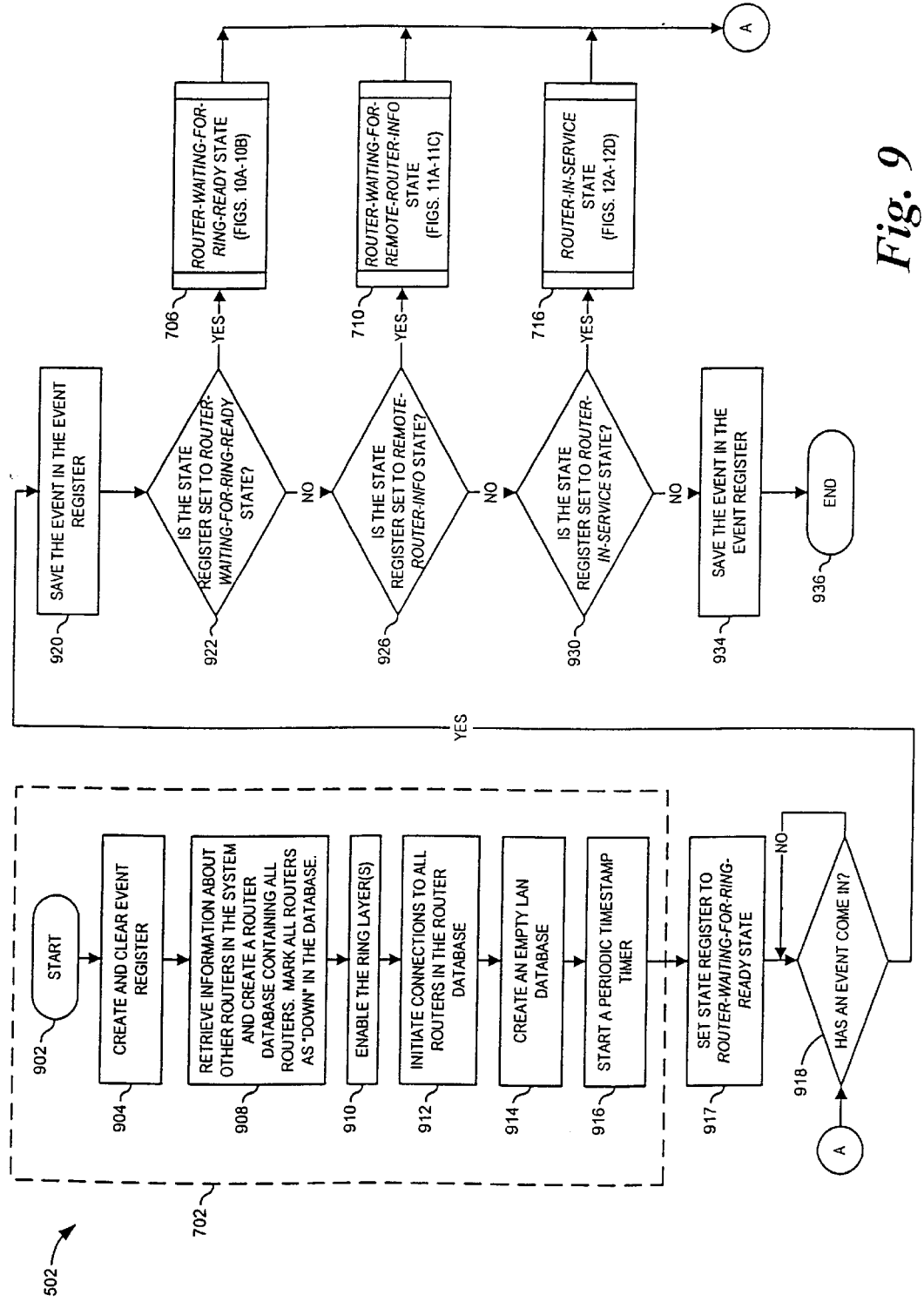
FIG. 9 is a representative high-level flow diagram depicting the initialization and state processes for a Totem router in accordance with the present invention.

FIG. 9 is a representative high-level flow diagram depicting execution of the step 502 (FIG. 5) to initialize the local router 122, followed by an implementation of events and states associated with on-going operation of the router 122. During the state 702 (FIG. 7), the following steps 902–916 are substantially performed. Accordingly, in step 902, power is applied to the router 122. In step 904, the event register 214 (FIG. 2) is created and cleared. In step 908, the local router 122 automatically obtains, in a manner well-known in the art, information about the identification of other routers, i.e., the remote router 132, in the Totem ring network 100. The information about the other routers in the system is used to establish a router database 208 (FIG. 2) for each remote router which has been identified as a member of the local router's domain. Still further, in step 908, the remote router database status register(s) 208a are set to indicate that the remote routers are "down" (i.e., not actively communicating), and the identification of rings and servers connected to the remote router is cleared. In step 910, the enable-ring event 650 (FIGS. 6 and 8) is sent from the ordering layer 404 to the Totem ring layer 400 of the router 122. In step 912, the local router 122 initiates connections to the identified remote routers 132 by performing the connect events 652 (FIGS. 6 and 8) for all remote routers 132 in the remote router database 208. In step 914, the LAN database 210 is created and cleared of information. In step 916, the timestamp timer 216 (FIG. 2) is started. The timestamp timer 216 is utilized to track the time which elapses between the transfer of a local timestamp message to the LANs and remote routers by periodically issuing the timestamp-timeout event 612.

Upon completion of the steps 902–916 during the state 702, then in step 917 (analogous to the path 704 of FIG. 7), the state register 212 is created and set to the router-waiting-for-ring-ready state 706. In step 918, a determination is made whether an event has occurred, or "come in". If it is determined that an event has not come in, then execution returns to step 918, and step 918 is repeated until the occurrence of a new event is detected. If, in step 918, it is determined that an event has come in, then, in step 920, an indication of the event type is stored in the event register 214 (FIG. 2).

In step 922, a determination is made whether the state register 212 (FIG. 2) is set to the router-waiting-for-ring-ready state 706. If it is determined that the state register 212 is set to the router-waiting-for-ring-ready state 706, then execution enters the state 706, described in further detail below with respect to FIGS. 10A and 10B. Execution then returns to step 918.

If, in step 922, it is not determined that the state register 212 is set to the router-waiting-for-ring-ready state 706, then execution proceeds to step 926 wherein a determination is made whether the state register 212 (FIG. 2) is set to the router-waiting-for-remote-router-info state 710. If it is determined that the state register 212 is set to the router-waiting-for-remote-router-info state 710, then execution enters the state 710, described in further detail below with respect to FIGS. 11A–11C. Execution then returns to step 918.

If, in step 926, it is not determined that the state register 212 is set to the router-waiting-for-remote-router-info state 710, then execution proceeds to step 930 wherein a determination is made whether the state register 212 (FIG. 2) is set to the router-in-service state 716. If it is determined that the state register 212 is set to the router-in-service state 716, then execution enters the state 716, described in further detail below with respect to FIGS. 12A–12D. Execution then returns to step 918.

If, in step 930, it is not determined that the state register 212 is set to the router-in-service state 716, then and error has occurred. Execution proceeds to step 934 wherein the event is saved in the event register 214 for debugging purposes. In step 936, execution is terminated.

Figure 10A:
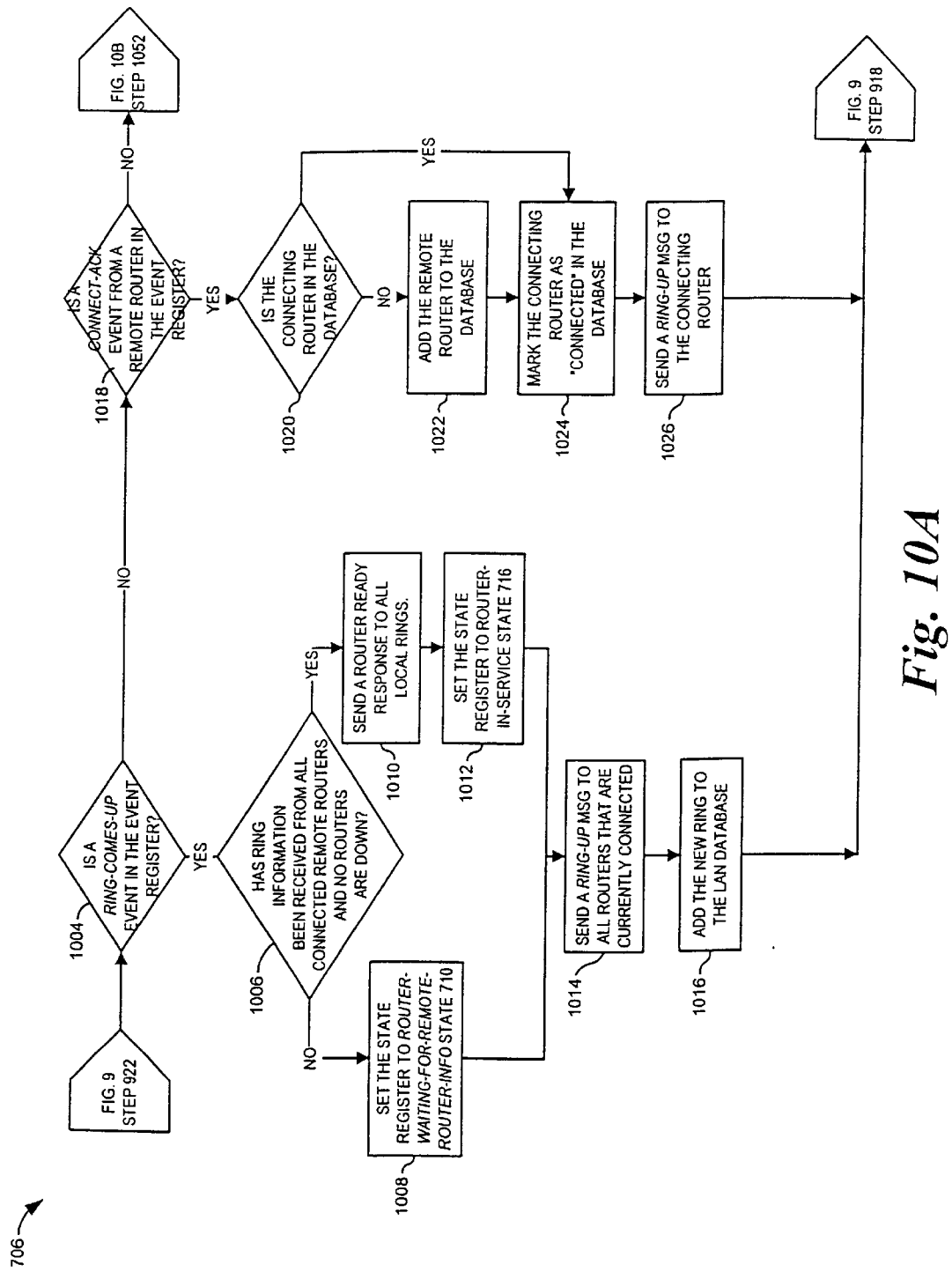
FIGS. 10A–10B are representative event sequence flow diagrams for a Totem router in a router-waiting-for-ring-ready state.
Figure 10B:
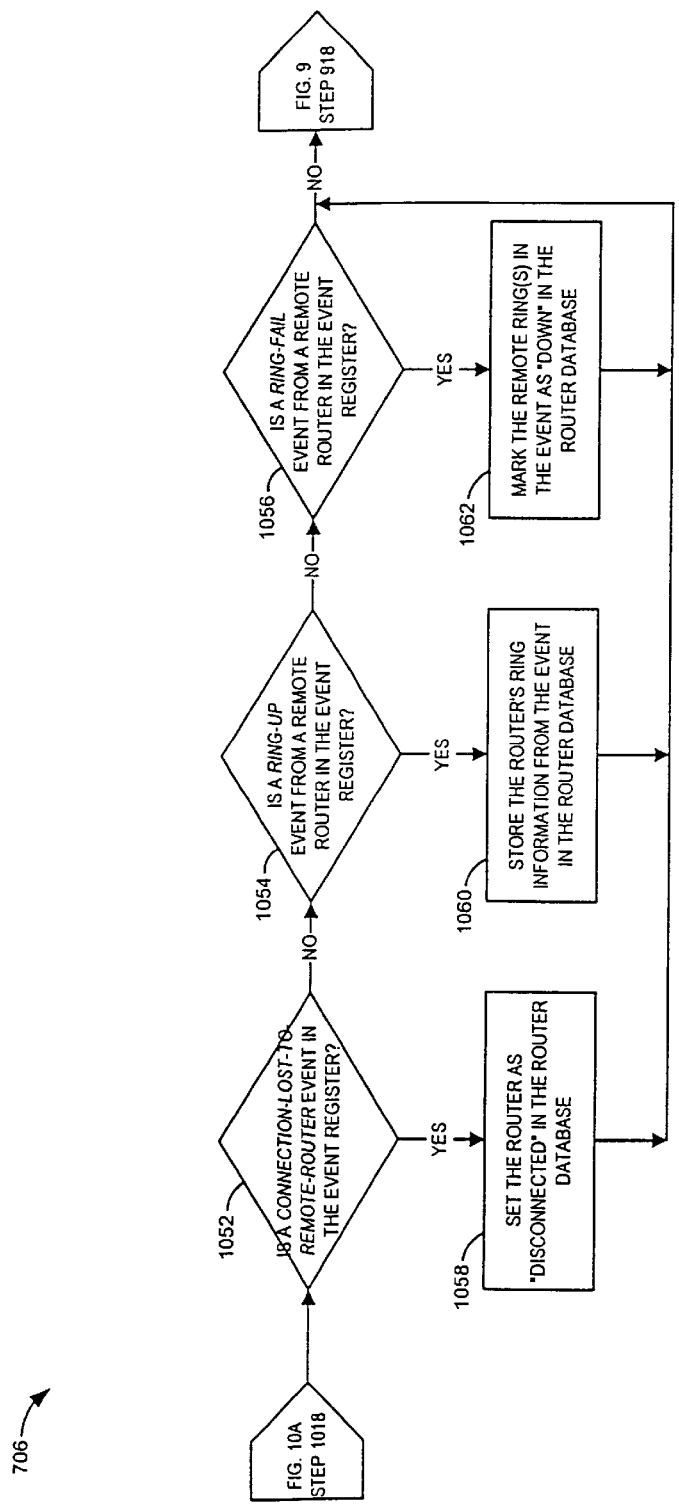

FIGS. 10A and 10B are flow diagrams depicting the operation of the present invention when in the router-waiting-for-the-ring-ready state of step 706, described above with respect to FIGS. 7 and 9.

In step 1004 a determination is made whether the event register 214 contains a ring-comes-up event 600. If the event register 214 contains a ring-comes-up event 600, then execution proceeds to step 1006.

In step 1006 a determination is made whether all remote routers in the remote router database 208 are marked connected in the status register 208a. If all remote routers are not marked connected, then execution proceeds to step 1008 (analogous to the path 708 of FIG. 7) wherein the state register 212 is set to the router-waiting-for-remote-router-info state 710. Execution then proceeds to step 1014.

If, in step 1006, a determination is made that all remote routers 132 are marked connected, then execution proceeds to step 1010 wherein the router 122 broadcasts a router-ready event 660 to all local rings it is connected to. It then proceeds to step 1012 (analogous to the path 714 of FIG. 7) wherein the state register 212 is set to the in-service state 716. Execution then proceeds to step 1014.

In step 1014, the local router 122 issues a ring-up event 656 to all routers in remote router database 208. Execution then proceeds to step 1016 wherein the ring identified in the ring-comes-up event 600 in event register 214 is added to the LAN database 210. Execution then proceeds to step 918.

If, in step 1004, it is determined that the event register 214 does not contain a ring-comes-up event 600, execution proceeds to step 1018. In step 1018 a determination is made whether the event register 214 contains a connection-ack-from-remote-router event 602 from a remote router. If it is determined that the event register 214 contains a connection-ack-from-remote-router event 602, then execution proceeds to step 1020.

In step 1020 a determination is made whether the event in event register 214 is from a router that is in the remote router database 208. If the remote router is not listed in the database 208, then execution proceeds to step 1022 wherein the remote router is added to database 208. Execution then proceeds to step 1024.

If, in step 1020, a determination is made that the router is listed in database 208, then execution proceeds to step 1024.

In step 1024, the status register 208a for the remote router identified in the connection-ack-from-remote-router event 602 in event register 214 is set to connected. Execution then proceeds to step 1026 wherein a ring-up event 656 is sent to the remote router identified in the connection-ack-from-remote-router event 602 in event register 214. Execution then returns to step 918 (FIG. 9).

If, in step 1018, it is determined that the event register 214 does not contain a connection-ack-from-remote-router event 602, then execution proceeds to step 1052 (FIG. 10B).

Referring to FIG. 10B, in step 1052, a determination is made whether the event register 214 contains a connection-lost-to-remote-router event 604 from a remote router. If it is determined that event register 214 contains a connection-lost-to-remote-router event 604, then execution proceeds to step 1058. In step 1058, the status register 208a for the remote router identified in the connection-lost-to-remote router event 604 in event register 214 is set to disconnected. Execution then returns to step 918.

If, in step 1052, it is determined that the event register 214 does not contain a connection-lost-to-remote-router event 604, execution proceeds to step 1054. In step 1054 a determination is made whether event register 214 contains a remote-ring-up-from-remote-router event 606. If it is determined that event register 214 contains a remote-ring-up-from-remote-router event 606, execution proceeds to step 1060 wherein the ring information from the remote-ring-up-from-remote-router event 606 in register 214 is stored in the remote router database 208. Execution then returns to step 918.

If in step 1054 it is determined that event register 214 does not contain a remote-ring-up-from-remote-router event 606, execution proceeds to step 1056. In step 1056, a determination is made whether the event register 214 contains a remote-ring-fail-from-remote-router event 608. If it is determined that the event register 214 contains a remote-ring-fail-from-remote-router event 608, then execution proceeds to step 1062 wherein the rings from the remote-ring-fail-from-remote-router event 608 in the event register 214 are removed from the remote router database 208. Execution then returns to step 918.

If in step 1056 it is determined that event register 214 does not contain a remote-ring-fail-from-remote-router event 608, execution returns to step 918.

Figure 11A:
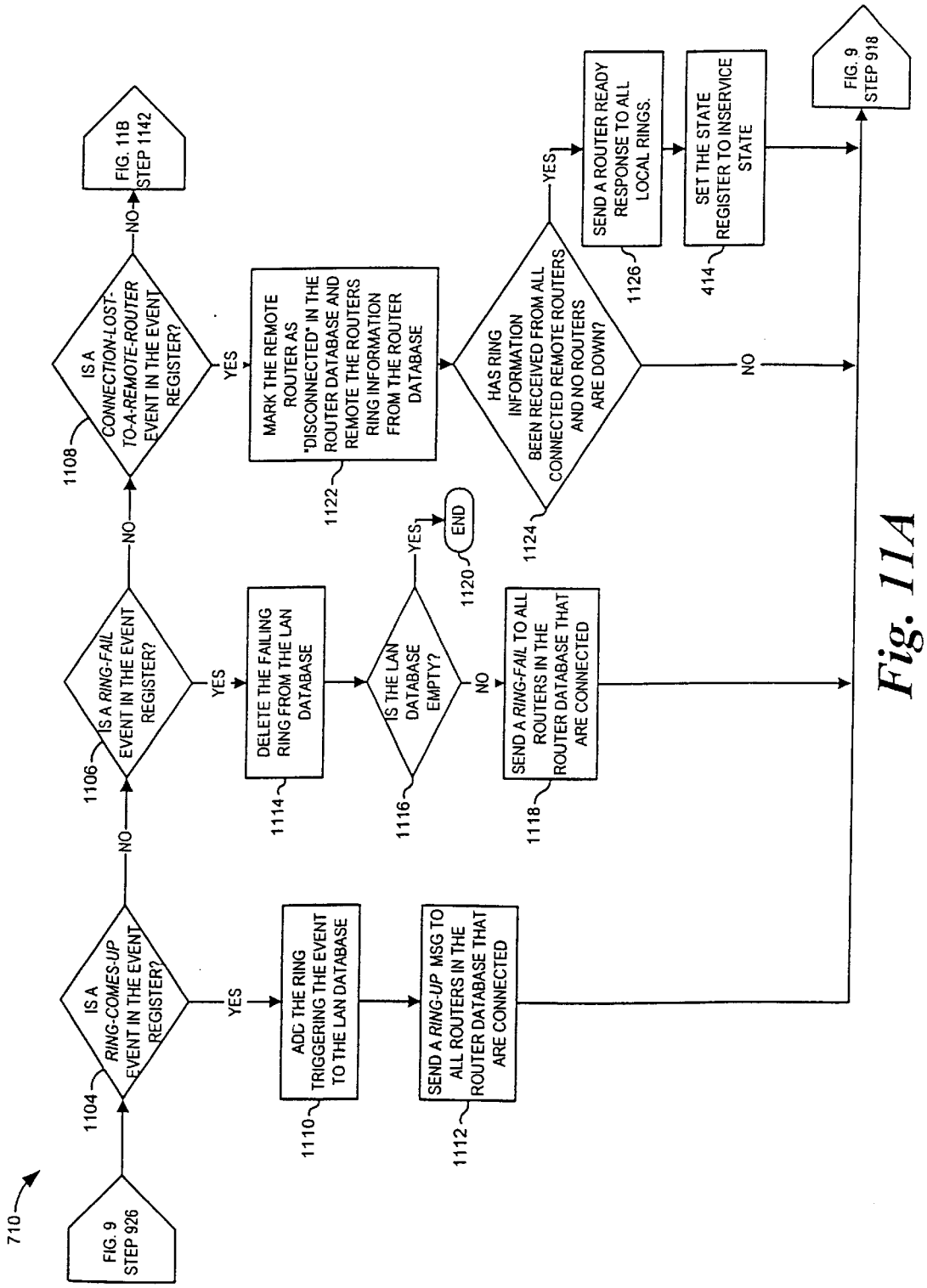
FIGS. 11A–11C are representative event sequence flow diagrams for a Totem router in a router-waiting-for-remote-router-information state.
Figure 11B:
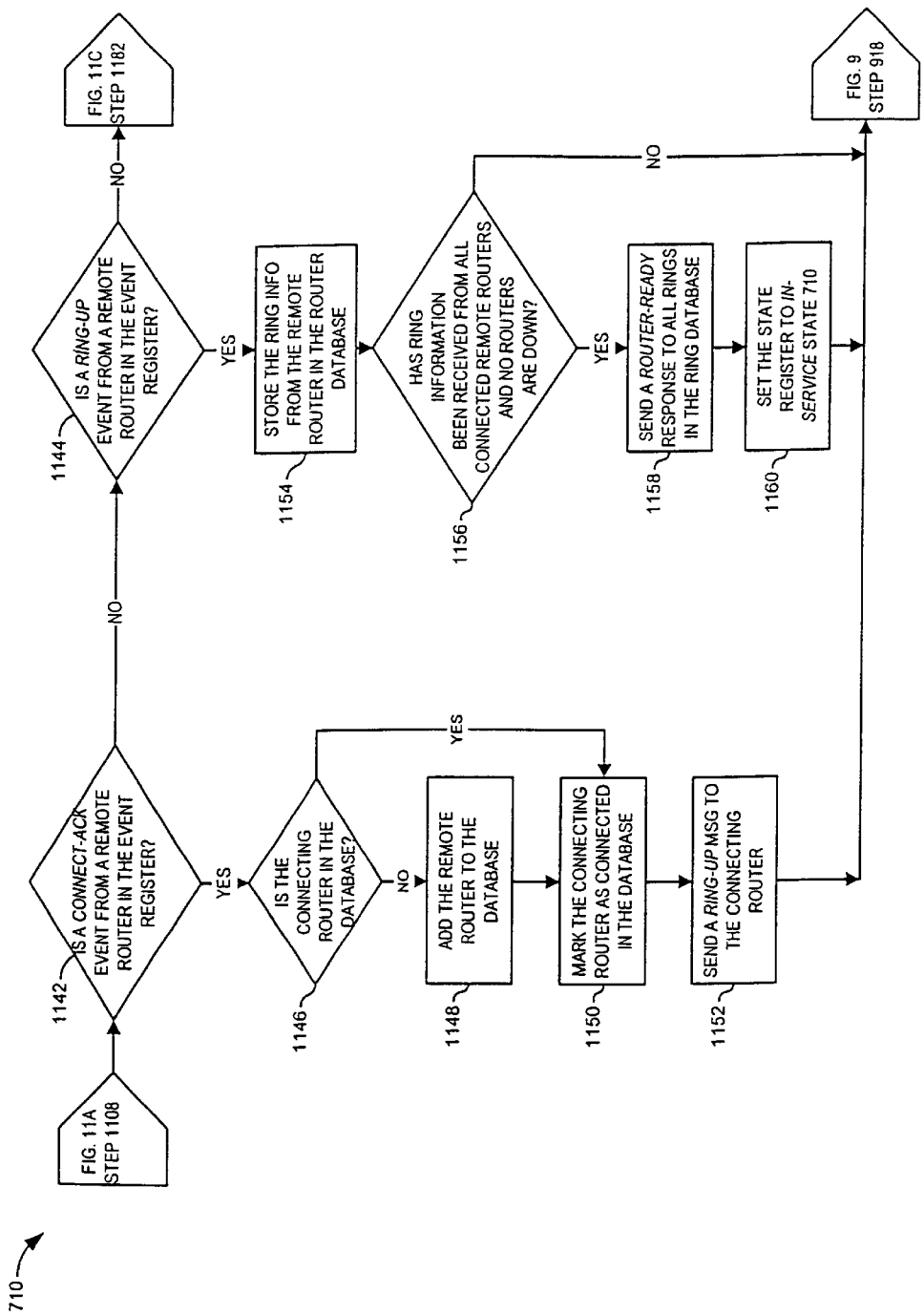
Figure 11C:
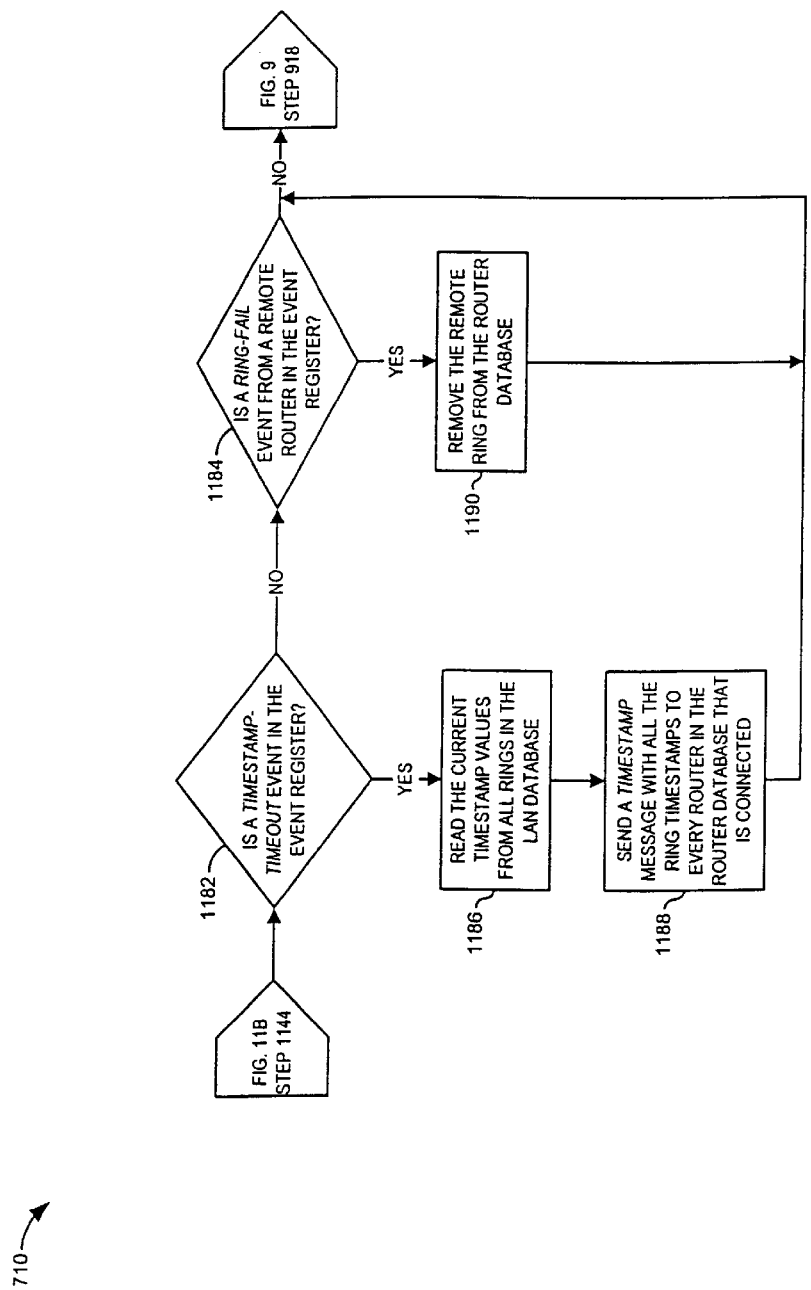

FIGS. 11A, 11B and 11C are flow diagrams depicting the operation of the present invention when in the router-waiting-for-remote-router-info state of step 710, described above with respect to FIGS. 7 and 9. Execution in the state 710 of FIG. 9 begins at step 1104 of FIG. 11A.

In step 1104, a determination is made whether the event register 214 contains a ring-comes-up event 600. If the event register 214 contains a ring-comes-up event 600, then execution proceeds to step 1110. In step 1110 the ring identified in the ring-comes-up event 600 in event register 214 is added to the LAN database 210. Execution then proceeds to step 1112 wherein a ring-up event 656 is sent to all remote routers whose status register 208a is set to "connected" in database 208. Execution then returns to step 918.

If, in step 1104, it is determined that the event register 214 does not contain a ring-comes-up event 600, execution proceeds to step 1106. In step 1106 a determination is made whether event register 214 contains ring-fails event 610. If it is determined that event register 214 contains a ring-fails event 610, execution proceeds to step 1114.

In step 1114, the ring identified in the ring-fail event 610 in event register 214 is deleted from the LAN database 210. Execution then proceeds to step 1116 wherein a determination is made whether the LAN database 210 contains no entries. If the LAN database 210 is empty, execution is terminated in step 1120. If the LAN database 210 is not empty, execution continues to step 1118 wherein a ring-fail event 658 is sent to all remote routers whose status register 208a is set to connected in database 208. Execution then returns to step 918.

If, in step 1106, it is determined that the event register 214 does not contain a ring-fails event 610, execution proceeds to step 1108. In step 1108 a determination is made whether the event register 214 contains connection-lost-to-remote-router event 604. If it is determined that event register 214 contains a connection-lost-to-remote-router event 604, then execution proceeds to step 1122, wherein the status register 208a for the remote router identified in the connection-lost-to-remote-router event 604 in the event register 214 is set to disconnected and the rings for that router are removed from the router database 208. Execution then proceeds to step 1124 wherein a determination is made whether no remote routers in the remote router database 208 are marked down and all connected remote routers have ring information. If no remote routers in the remote router database 208 are marked down and all "connected" remote routers have ring information, execution proceeds to step 1126 wherein the router 122 broadcasts a router-ready message 660 to all rings in the LAN database 210.

If, in step 1123, it is determined that some routers in the remote router database 208 are marked down or not all "connected" remote routers have ring information, execution returns to step 918.

If, in step 1108, it is determined that event register 214 does not contain a connection-lost-to-remote-router event 604, then execution proceeds to step 1142 (FIG. 11B).

Referring to FIG. 11B, in step 1142 a determination is made whether event register 214 contains a connection-ack-from-remote-router event 602. If it is determined that event register 214 contains a connection-ack-from-remote-router event 602, execution proceeds to step 1146.

In step 1146 a determination is made whether the router identified in the connection-ack-from-remote-router event 602 in event register 214 is in the remote router database 208. If the router is in the remote router database 208, execution continues to step 1150. If the remote router is not in the database, execution continues to step 1148 wherein the remote router is added to the database. Execution then continues to step 1150.

In step 1150, status register 208a for the remote router is set to connected and execution proceeds to step 1152 wherein a ring-up event 656 is sent to all remote routers whose status register 208a is set to connected in database 208. Execution then returns to step 918.

If, in step 1142, it is determined that the event register 214 does not contain a connection-ack-from-remote-router event 602, execution proceeds to step 1144. In step 1144 a determination is made whether event register 214 contains a remote-ring-up-from-remote-router event 606. If it is determined that event register 214 contains a remote-ring-up-from-remote-router event 606, execution proceeds to step 1154.

In step 1154, the ring information from the remote-ring-up-from-remote-router event 606 in register 214 is stored in the remote router database 208. Execution proceeds to step 1156 wherein a determination is made whether no remote routers in the remote router database 208 are marked "down" and all "connected" remote routers have ring information. If it is determined that some routers in the remote router database 208 are marked "down" or not all "connected" remote routers have ring information, execution proceeds to step 918.

If, in step 1156, it is determined that no remote routers in the remote router database 208 are marked down and all "connected" remote routers have ring information, the router continues execution at step 1158 wherein it broadcasts a router-ready message 660 to all rings in the LAN database 210. Execution then proceeds to step 1160 (analogous to the path 712 of FIG. 7) wherein the state register 212 is set to the router-in-service state 716. Execution then returns to step 918.

If, in step 1144, it is determined that event register 214 does not contain a remote-ring-up-from-remote-router event 606, execution proceeds to step 1182 (FIG. 11C).

Referring to FIG. 11, in step 1182 a determination is made whether event register 214 contains a timestamp timeout event 612. If it is determined that event register 214 contains a timestamp timeout event 612, execution proceeds to step 1186.

In step 1186, timestamp values are read from each ring in the LAN database 210. Execution then proceeds to step 1188 wherein the timestamp values just read are sent to every remote router in the router database 208 whose state register 208a is set to connected. Execution then returns to step 918.

If, in step 1182, it is determined that the event register 214 does not contain a timestamp-timeout event 612, execution proceeds to step 1184. In step 1184 a determination is made whether the event register 214 contains a remote-ring-fail-from-remote-router event 608. If it is determined that the event register 214 contains a remote-ring-fail-from-remote-router event 608, execution proceeds to step 1190 wherein the ring identified in the remote-ring-fail-from-remote-router event 608 in event register 214 is removed from the router database 208. Execution then returns to step 918. If, in step 1184, it is not determined that the event register 214 contains a remote-ring-fail-from-remote-router event 608, then execution returns to step 918.

FIGS. 12A, 12B, 12C and 12D are flow diagrams depicting the operation of the present invention when in the router-in-service state 716, described above with respect to FIG. 9. Execution in the state 716 begins at step 1204 in FIG. 12A.

In step 1204 a determination is made whether event register 214 contains a ring-comes-up event 600. If the event register 214 contains a ring-comes-up event 600, execution proceeds to step 1210. In step 1210 the ring identified in the ring-comes-up event 600 in event register 214 is added to the LAN database 210. Execution then proceeds to step 1212 wherein a ring-up event 656 is sent to all remote routers whose status register 208a is set to connected in database 208 and to all rings in the LAN database 210 except the ring that just came. up. Execution then returns to step 918.

If, in step 1204, it is determined that event register 214 does not contain a ring-comes-up event 600, execution proceeds to step 1206. In step 1206 a determination is made whether event register 214 contains a ring-fails event 610. If it is determined that event register 214 contains a ring-fails event 610, execution proceeds to step 1216.

In step 1216, the ring identified in the ring-fail event 610 in event register 214 is deleted from the LAN database 210. Execution then proceeds to step 1218 wherein a determination is made whether the LAN database 210 contains no entries. If the LAN database 210 is empty, execution is terminated in step 1220. If the LAN database 210 is not empty, execution continues to step 1222 wherein a ring-fail event 658 is sent to all remote routers whose status register 208a is set to connected in the remote router database 208. Execution then proceeds to step 1224 wherein a system-ring-failure event 662 is broadcast to all servers in the system. Execution then returns to step 918.

If, in step 1206, it is determined that the event register 214 does not contain a ring-fails event 610, then execution proceeds to step 1208. In step 1208, a determination is made whether event register 214 contains a connection-lost-to-remote-router event 604. If it is determined that event register 214 contains a connection-lost-to-remote-router event 604, execution proceeds to step 11226.

In step 1226 the status register 208a for the remote router identified in the connection-lost-to-remote-router event 604 in event register 214 is set to "disconnected" and the rings for that router are removed from the router database 208. In step 1228 a system-ring-failure event 662 is broadcast to every server in the system. That event will contain a failure for every ring in the remote-router database 208 that the failed router previously identified in remote-ring-up-from-remote-router events 606.

Figure 12A:
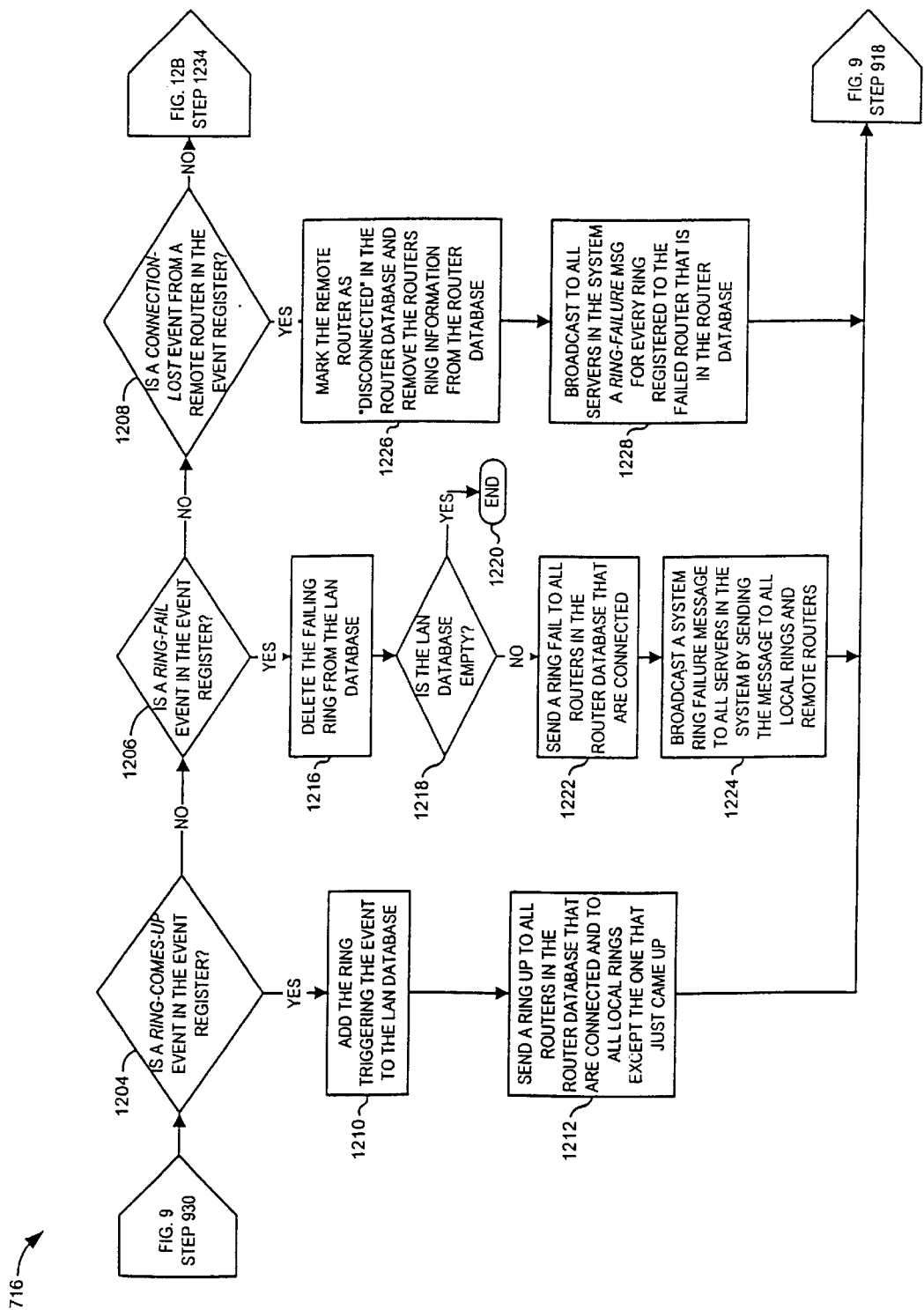
FIGS. 12A–12D are representative event sequence flow diagrams for a Totem router in a router-in-service state.
Figure 12B:
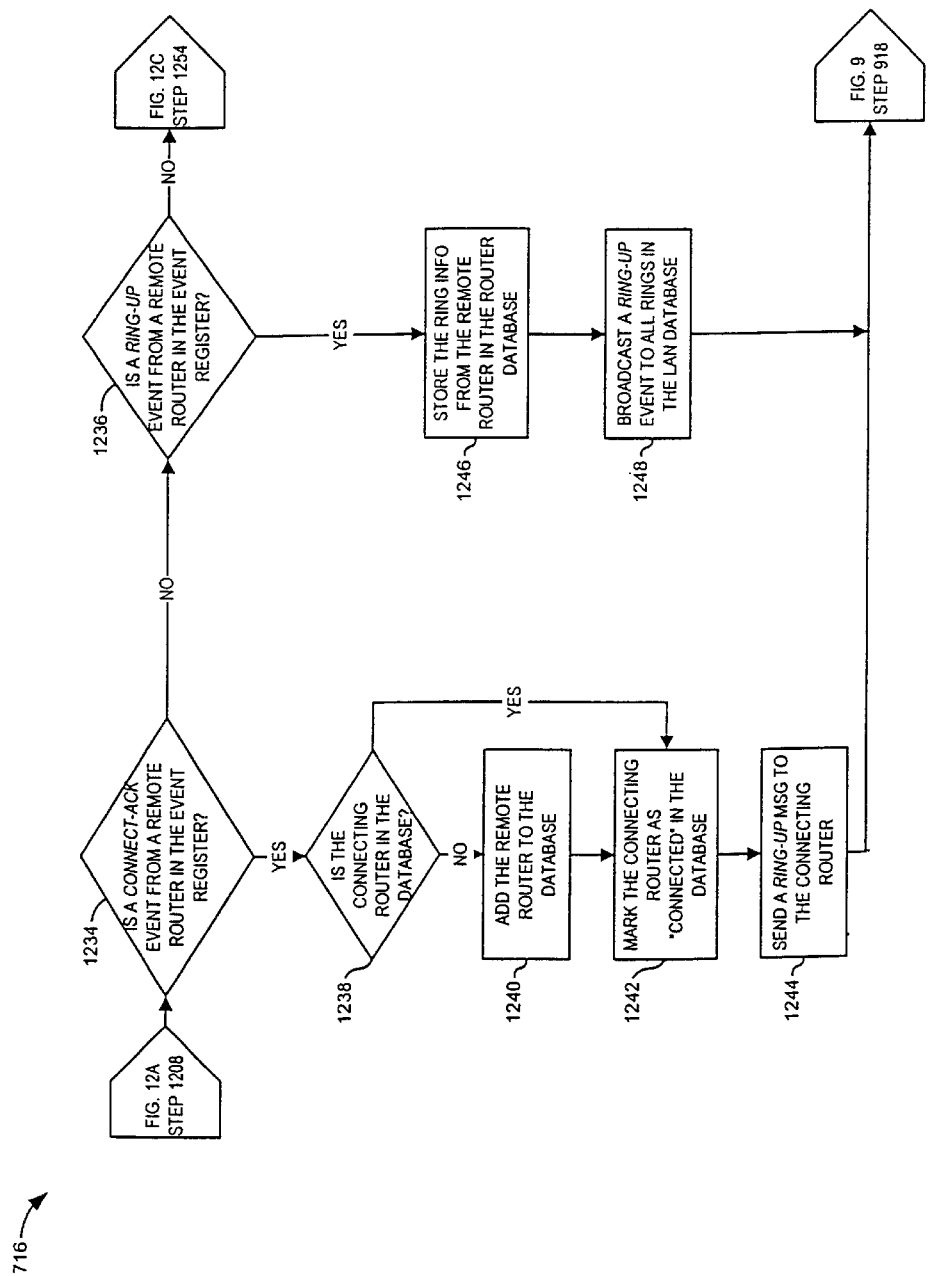

If, in step 1208, it is determined that the event register 214 does not contain a connection-lost-to-remote-router event 604, then execution proceeds to step 1234 (FIG. 12B).

Referring to FIG. 12B, in step 1234 a determination is made whether event register 214 contains a connection-ack-from-remote-router event 602. If it is determined that event register 214 contains a connection-ack-from-remote-router event 602, execution proceeds to step 1238.

In step 1238 a determination is made whether the router identified in the connection-ack-from-remote-router event 602 in event register 214 is in the remote router database 208. If the router is in the remote router database 208, execution continues to step. 1242. If the remote router is not in the database, execution continues to step 1240 wherein the remote router is added to the database. Execution then continues to step 1242.

In step 1242, the status register 208a for the remote router is set to connected and execution proceeds to step 1244 wherein a ring-up event 656 is sent to all remote routers whose status register 208a is set to connected in the remote router database 208. Execution then returns to step 918.

If, in step 1234, it is determined that the event register 214 does not contain a connection-ack-from-remote-router event 602, then execution proceeds to step 1236. In step 1236, a determination is made whether the event register 214 contains a remote-ring-up-from-remote-router event 606. If it is determined that event register 214 contains a remote-ring-up-from-remote-router event 606, then execution proceeds to step 1246.

In step 1246, the ring information from the remote-ring-up-from-remote-router event 606 in the event register 214 is stored in the remote router database 208. Execution then proceeds to step 1248 wherein the ring-up event 606 is broadcast to all servers on all ring in the LAN database 210. Execution then returns to step 918.

Figure 12C:
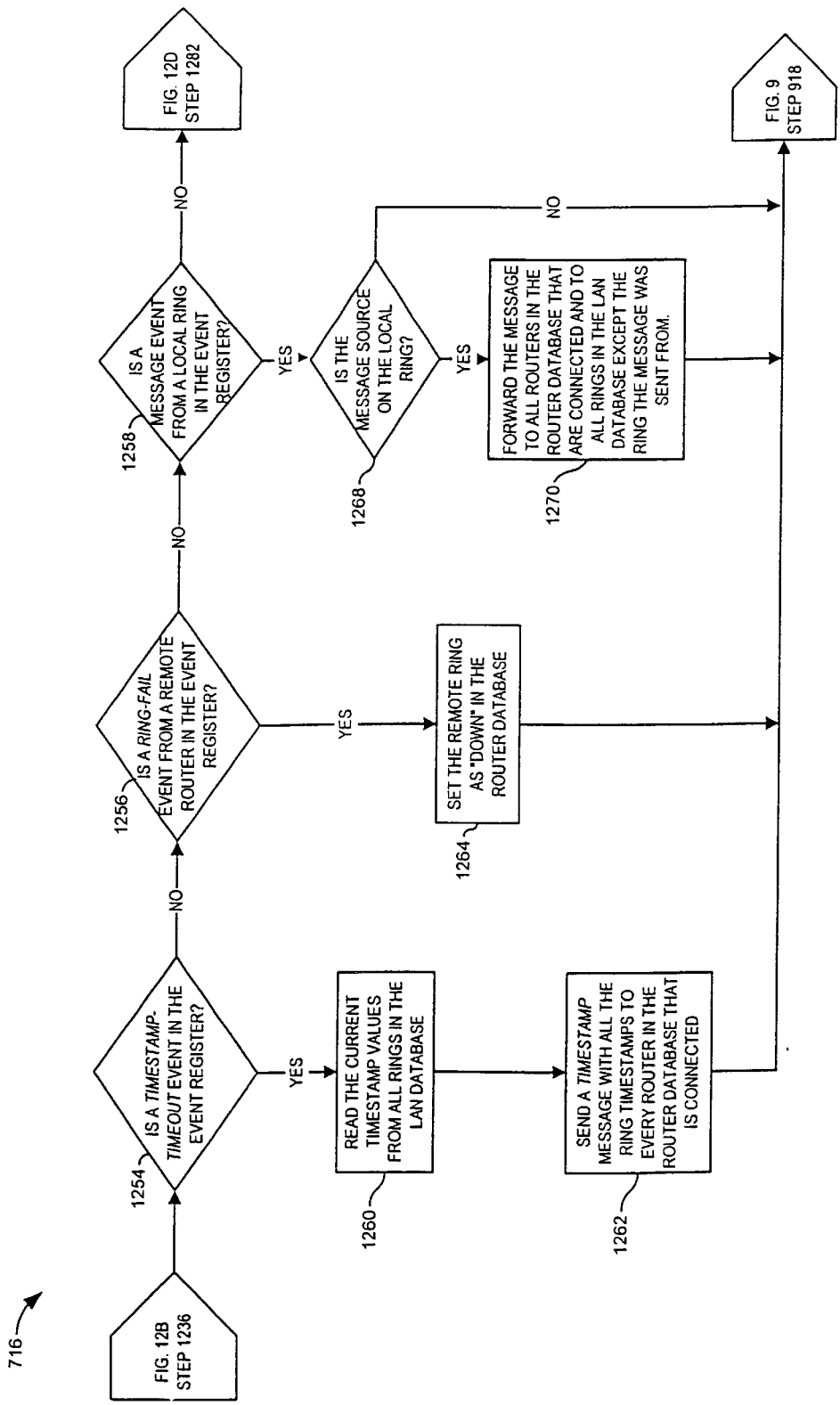

If, in step 1236, it is determined that event register 214 does not contain a remote-ring-up-from-remote-router event 606, then execution proceeds to step 1254 (FIG. 12C).

Referring to FIG. 12C, in step 1254, a determination is made whether the event register 214 contains a timestamp timeout event 612. If it is determined that event register 214 contains a timestamp timeout event 612, execution proceeds to step 1260.

In step 1260, timestamp values are read from each ring in the LAN database 210. Execution then proceeds to step 1262 wherein the timestamp values just read are sent to every remote router in the router database 208 whose state register 208a is set to "connected". Execution then returns to step 918.

If, in step 1254, it is determined that the event register 214 does not contain a timestamp-timeout event 612, then execution proceeds to step 1256. In step 1256 a determination is made whether event register 214 contains a remote-ring-fail-from-remote-router event 608. If it is determined that event register 214 contains a remote-ring-fail-from-remote-router event 608, execution proceeds to step 1264 wherein the ring identified in the remote-ring-fail-from-remote-router event 608 in event register 214 is removed from the remote router database 208.

If, in step 1256, it is determined that event register 214 does not contain a timestamp-timeout event 612, execution proceeds to step 1258. In step 1258 a determination is made whether event register 214 contains a message-from-ring event 614. If it is determined that event register 214 contains a message-from-ring event 614, execution proceeds to step 1268.

In step 1268 a determination is made whether the original source of the message contained in the message-from-ring event 614 in event register 214 was on the ring the message was just received from. If not, execution continues at step 918. If the message's original source was on the ring the message was just received from, execution continues at step 1270 wherein the message is forwarded to all rings in the LAN database 210 except the source ring and all remote routers in the remote router database 208 whose status register 208a holds connected.

Figure 12D:
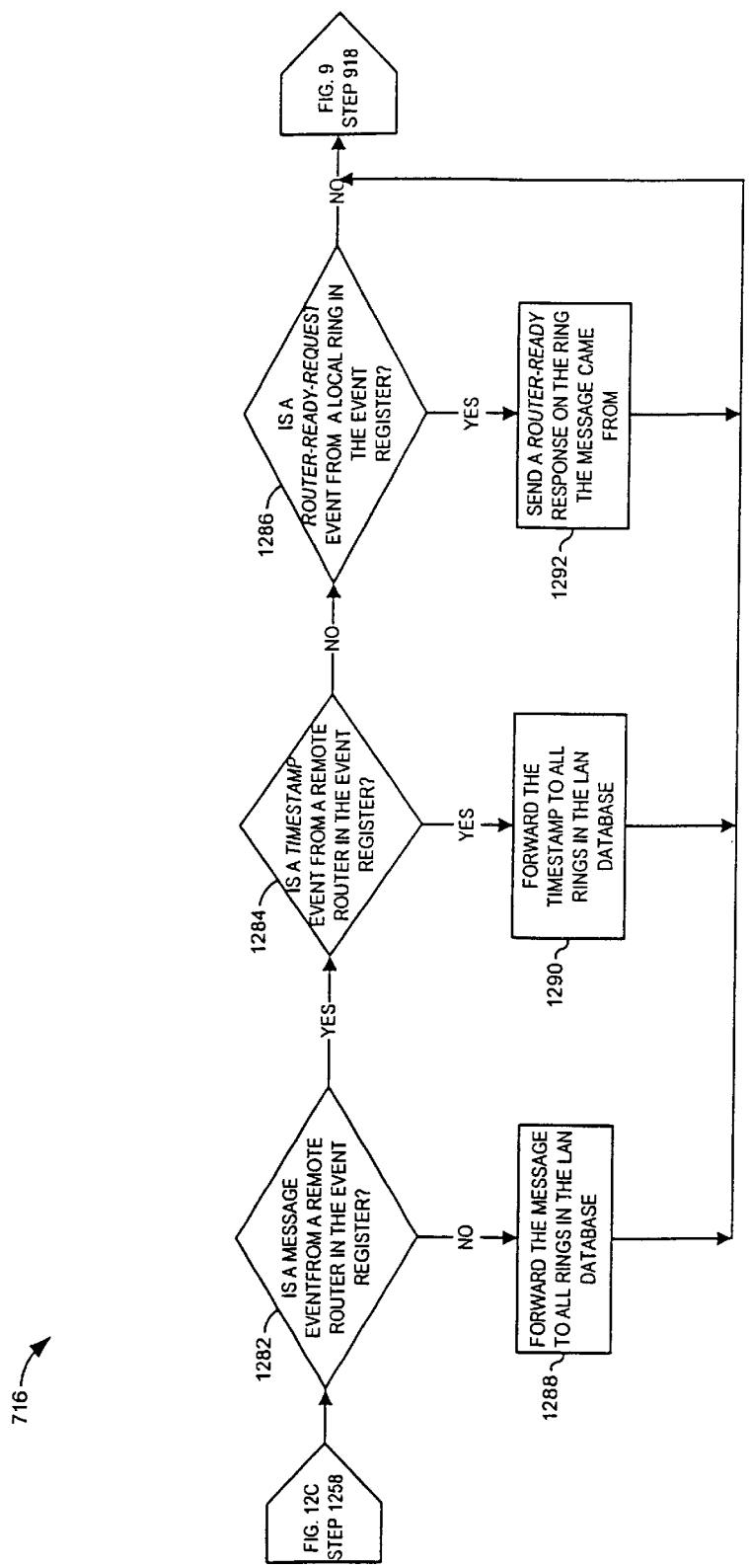

If, in step 1258, it is determined that the event register 214 does not contain a message-from-ring event 614, then execution proceeds to step 1282 (FIG. 12D).

Referring to FIG. 12D, in step 1282, a determination is made whether the event register 214 contains a message-from-remote-router event 616. If it is determined that event register 214 contains a message-from-remote-router event 616, execution proceeds to step 1288, wherein the message is forwarded to all rings currently in the LAN database 210.

If, in step 1282, it is determined that the event register 214 does not contain a message-from-remote-router event 616, execution proceeds to step 1284. In step 1284 a determination is made whether event register 214 contains a timestamp-message-from-remote-router event 618. If it is determined that event register 214 contains a timestamp-message-from-remote-router event 618, execution proceeds to step 1290, wherein the timestamp message is forwarded to all rings currently in the LAN database 210.

If, in step 1284, it is determined that the event register 214 does not contain a timestamp-message-from-remote-router event 616, execution proceeds to step 1286. In step 1286 a determination is made whether event register 214 contains a router-ready-request-from-ring event 620. If it is determined that event register 214 contains a router-ready-request-from-ring event 620, execution proceeds to step 1292, wherein a router-ready-response event is sent on the ring that the router-ready-request-from-ring event 620 in the event register 214 came from. Execution then returns to step 918.

If, in step 1286, it is determined that the event register 214 does not contain a router-ready-request-from-ring event 620, execution returns to step 918.

Figure 13:
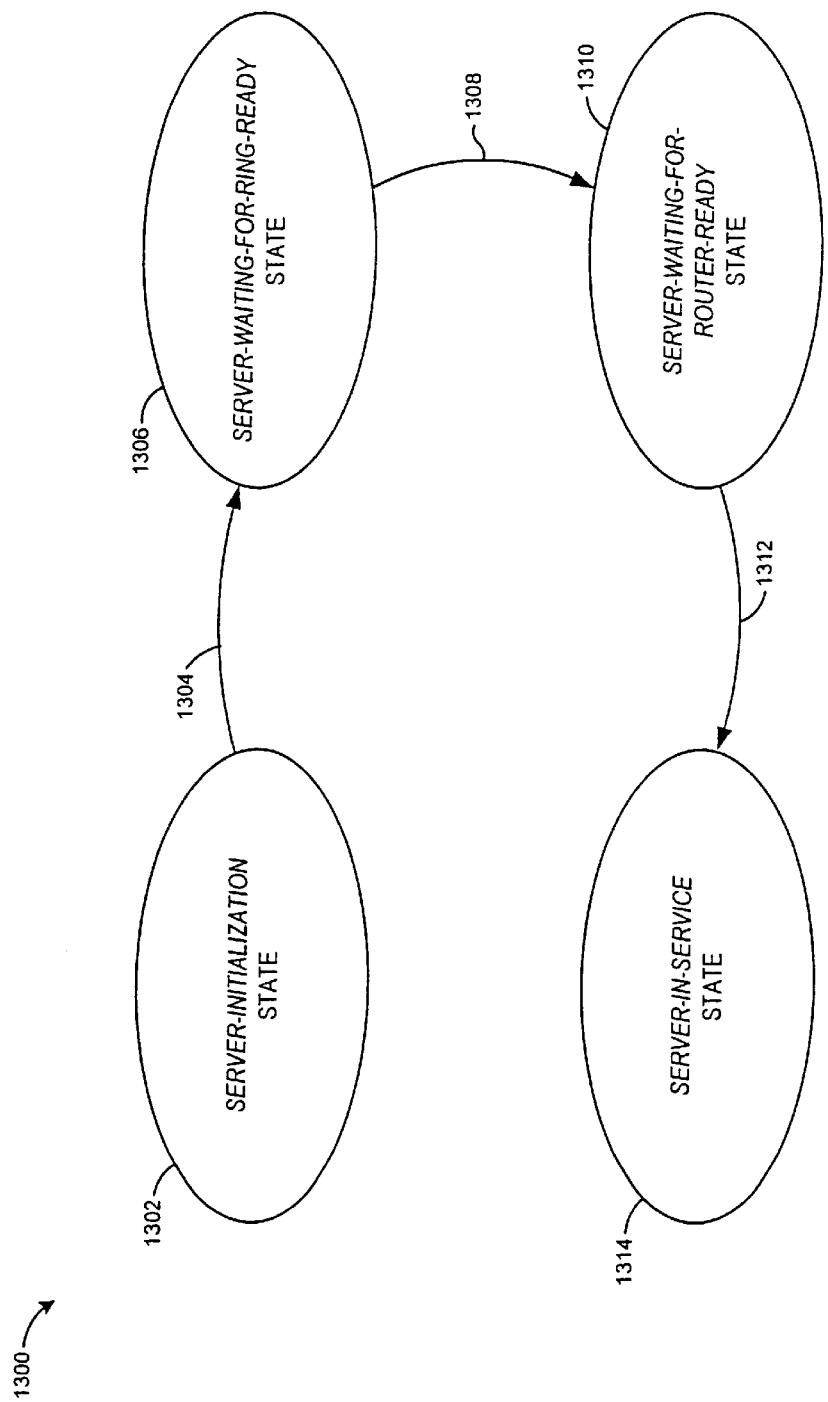
FIG. 13 is a state diagram illustrating four operating states of a server of the present invention.

FIG. 13 depicts a state diagram 1300 showing four representative general operating states of a server of the present invention. The operating state is tracked in the server state register 312, discussed above.

As depicted in FIG. 13, a server-initialization state 1302 is set in the state register 312 when the server 124 is initially powered on, as may follow when the router or ring fail, standard system maintenance is performed, or the server hardware fails, causing the server to restart its operation. The server 124 remains in the server-initialization state 1302 until it has finished initializing its internal data structures. After initialization, the server 124 passes from server-initialization state 1302 to server-waiting-for-ring-ready state 1306. The server 124 remains in the server-waiting-for-ring-ready state 1306 until it determines that the LAN 120 is ready to receive and process messages.

Upon a determination that the LAN 120 is ready to receive and process messages, the server 124 passes from the server-waiting-for-ring-ready state 1306 to a server-waiting-for-router-ready state 1310, as indicated schematically by an arrow 1308. The server 124 stays in server-waiting-for-router-ready state 1310 until it receives a router-ready event 660. Upon receiving a router-ready event 660, the server 124 proceeds from server-waiting-for-router-ready state to server-in-service state 1314 as indicated schematically by arrow 1312.

In the server-in-service state 1314, the server is then able to create processes, send and receive messages, and perform other operations in accordance with standard Totem ring network operation.

Server application software (not shown) is located within the host memory 302 (FIG. 3) of the server 124 for execution by the host processor 300 of the server 124 to maintain the status in the event register 314 of the foregoing server states 1302, 1306, 1310, 1314 (FIG. 13) by monitoring the Totem router network 100 for the occurrence of various events which represent a change in status. An incoming event from the Totem router network 100 via the link 106 is stored in the event register 314 and is utilized for processing a particular state, and for controlling movement into and out of a particular state.

Figure 14:
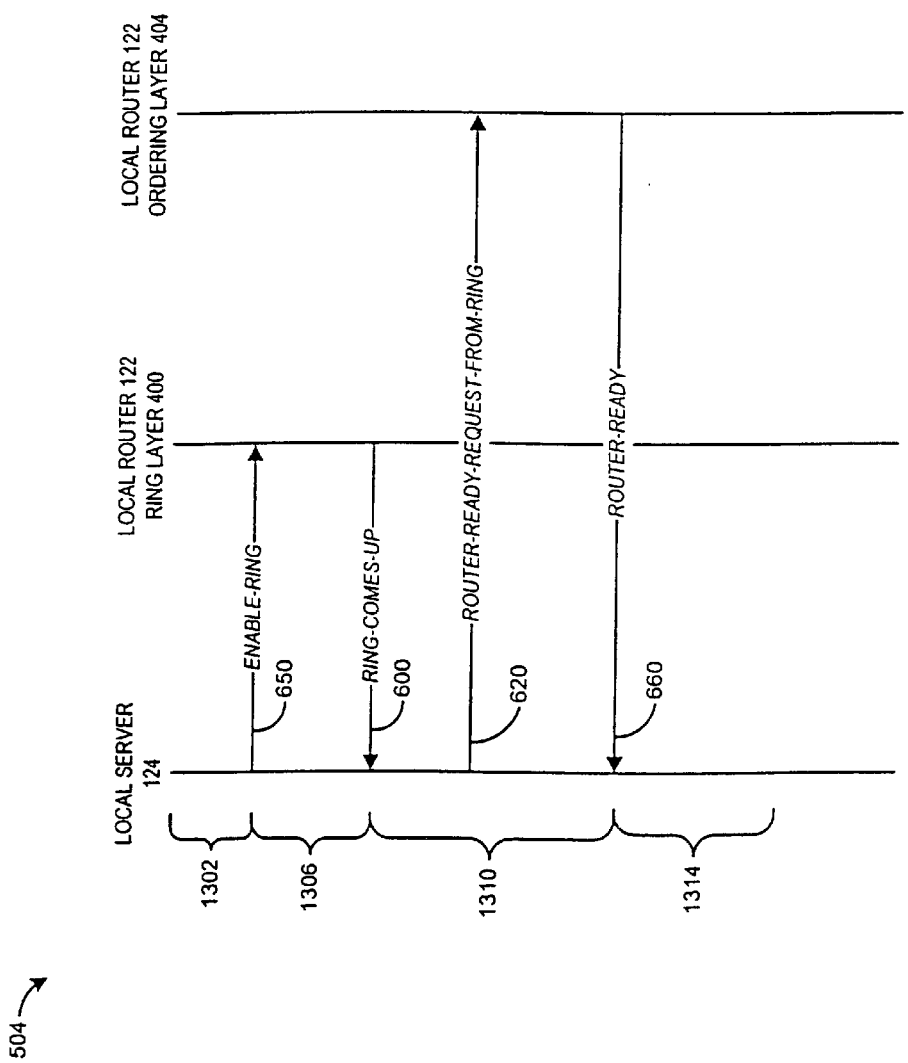
FIG. 14 is a representative message sequence diagram showing the initialization of a server of FIG. 1.

FIG. 14 depicts a preferred sequence for communicating error-free messages between subsystems in accordance with the present invention. It should be noted, however, that in alternative embodiments, the sequence of messages may differ. It should also be noted that in FIG. 14, events occur timewise from the top of the diagram to the bottom of the diagram.

Accordingly, FIG. 14 illustrates a representative sequence of error-free messages for performing step 504 of FIG. 5 to initialize the Totem servers 124 on the Totem first ring 120, after the first Totem ring 120 is activated, as is assumed in the present case.

When the local server 124 comes up and is ready to join the local Totem ring 102 and external network 110, the server 124 sends an enable-ring message 650 to the ring layer 400 of the local router 122, to determine whether the LAN 120 is ready to receive and process messages from the server 124. If the LAN 120 is ready to receive and process messages, then in response to the enable-ring message 650, the ring layer 400 of the local router 122 returns a ring-comes-up message 600.

The server 124 sends a router-ready-request-from-ring message 620 on LAN 120 to the operating layer 404 of the local Totem router 122. The local Totem router 122 sends a router-ready message 660 on the LAN 120 to inform the server 124 that the router-ready-request-from-ring message 620 has been recognized, and that the local router 124 is ready for service on the LAN 120.

Figure 15:
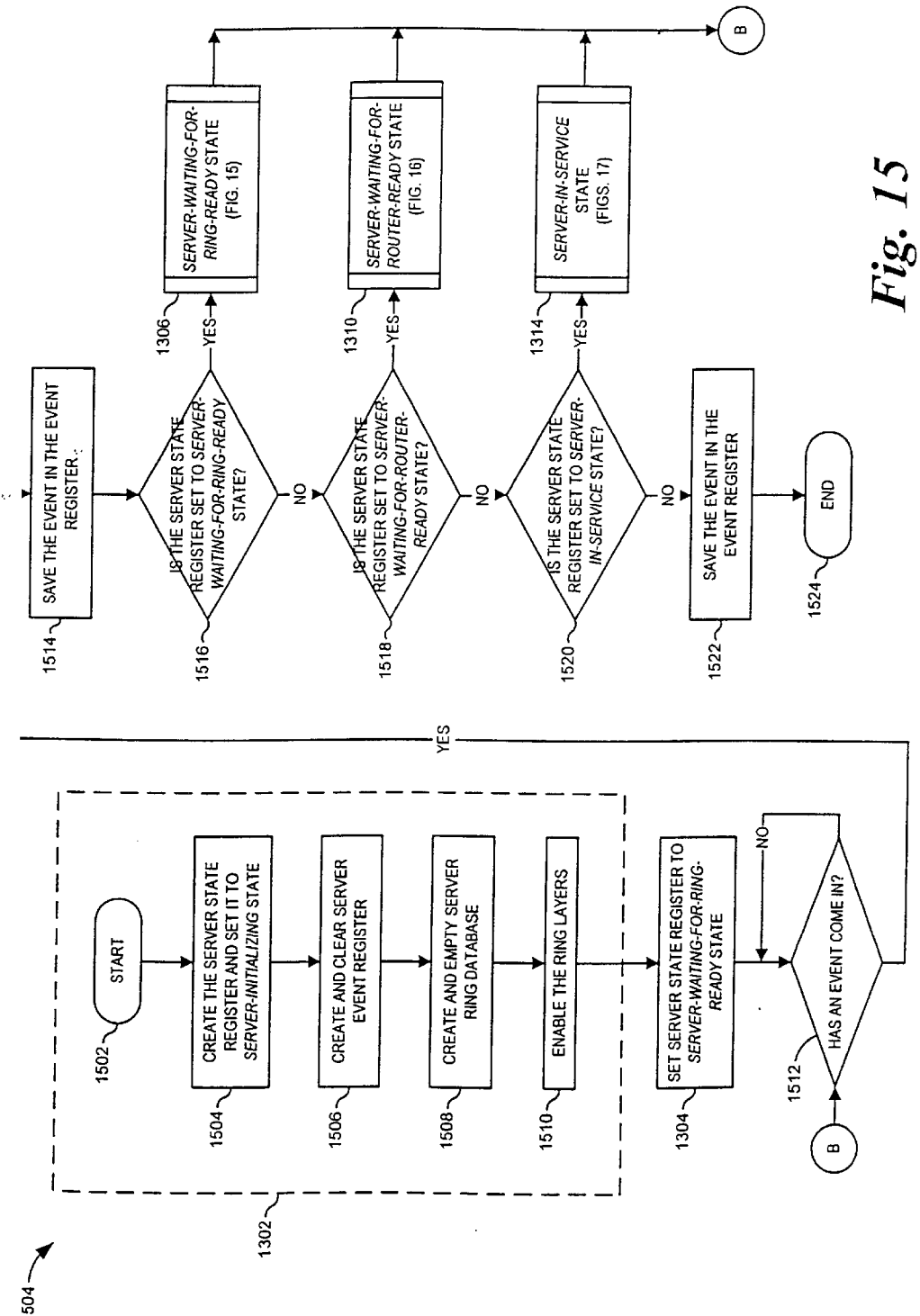
FIG. 15 is a representative high-level flow diagram depicting the initialization and state processes for a Totem server of FIG. 1.

FIG. 15 is a representative high-level flow diagram depicting execution of the step 504 (FIG. 5) to initialize the server 124, followed by the implementation of the events and states associated with the operation of server 124.

In step 1502, power is applied to server 124. In step 1504, the server state event register 312 is created and set to the server-initialization state 1302. In step 1506, the server event register 314 is created and cleared. In state 1508, the server ring database 310 is created and cleared of contents. In step 1510, the enable-ring event 650 (FIGS. 6 and 14) is sent from the ordering layer 404 to the Totem ring layer 400 of the router 122. In step 1304, the server state register 312 is set to the server-waiting-for-ring-ready state 1306. Execution then returns to step 1512.

In step 1512, a determination is made whether an even has occurred, or "come in". If it is determined that an event has not come in, then execution returns to step 1512, and step 1512 is repeated until the occurrence of a new event is detected. Upon a determination in step 1512 that an event has come in, then execution proceeds to step 1514 wherein the event is stored in the server event register 314.

In step 1516, a determination is made whether the server state register 312 (FIG. 3) is set to the server-waiting-for-ring-ready state 1306. If it is determined that the state register 312 is set to the server-waiting-for-ring-ready state 1306, then execution proceeds to step 1306, which is described in further detail below with respect to FIG. 16. Execution then returns to step 1512.

If in step 1516, it is not determined that the state register 312 is set to the server-waiting-for-ring-ready state 1306, then execution proceeds to step 1518 wherein a determination is made whether the server state register 312 (FIG. 3) is set to the server-waiting-for-router-ready state 1310. If it is determined that the state register 312 is set to the server-waiting-for-router-ready state 1310, then execution proceeds to step 1310, which is described in further detail below with respect to FIG. 17. Execution then returns to step 1512.

If in step 1518 it is not determined that the state register 312 is set to the server-waiting-for-router-ready state 1310, then execution proceeds to step 1520 wherein a determination is made whether the state register 312 (FIG. 3) is set to the server-in-service state 1314. If it is determined that the state register 312 is set to the server-in-service state 1314, then execution proceeds to step 1314, which is described in further detail below with respect to FIG. 18. Execution then returns to step 1512.

If in step 1520, it is not determined that the state register 312 is set to the server-in-service state 1314, then and error has occurred. Execution proceeds to step 1522 wherein the event is saved in the event register 312 for debugging purposes. In step 1524, execution is terminated.

Figure 16:
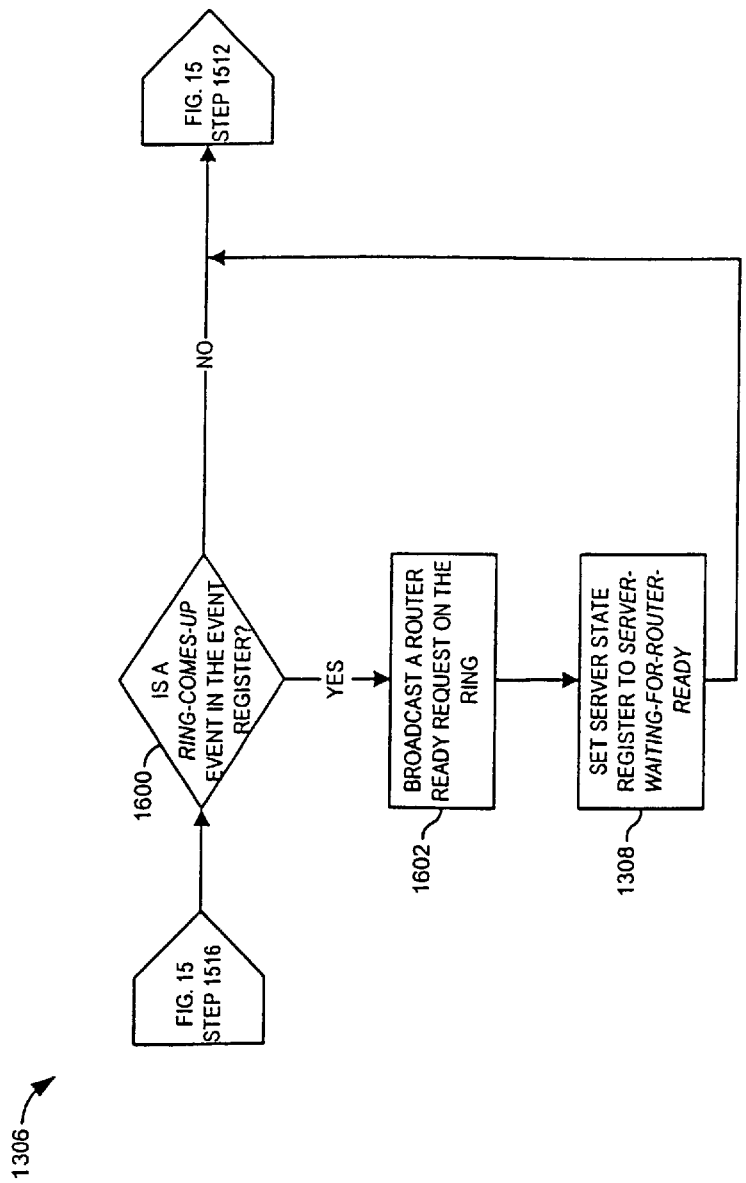
FIG. 16 is a representative event sequence flow diagram for the Totem server of FIG. 1 in a server-waiting-for-ring-ready state.

FIG. 16 depicts the representative operation of the server 124 in the server-waiting-for-ring-ready state 1306. Execution proceeds from step 1516 to step 1600 wherein a determination is made whether a ring-comes-up event 600 is in the server event register 314. If it is determined that a ring-comes-up event 600 is in the server event register 314, execution proceeds to step 1602 wherein a router-ready-request-form-ring event is sent on the ring that just came up. Execution then proceeds to step 1308 wherein the server state register 312 is set to server-waiting-for-router-ready state. If in step 1600 it is determined that a ring-comes-up event 600 is not in server event register 314, execution returns to step 1512.

Figure 17:
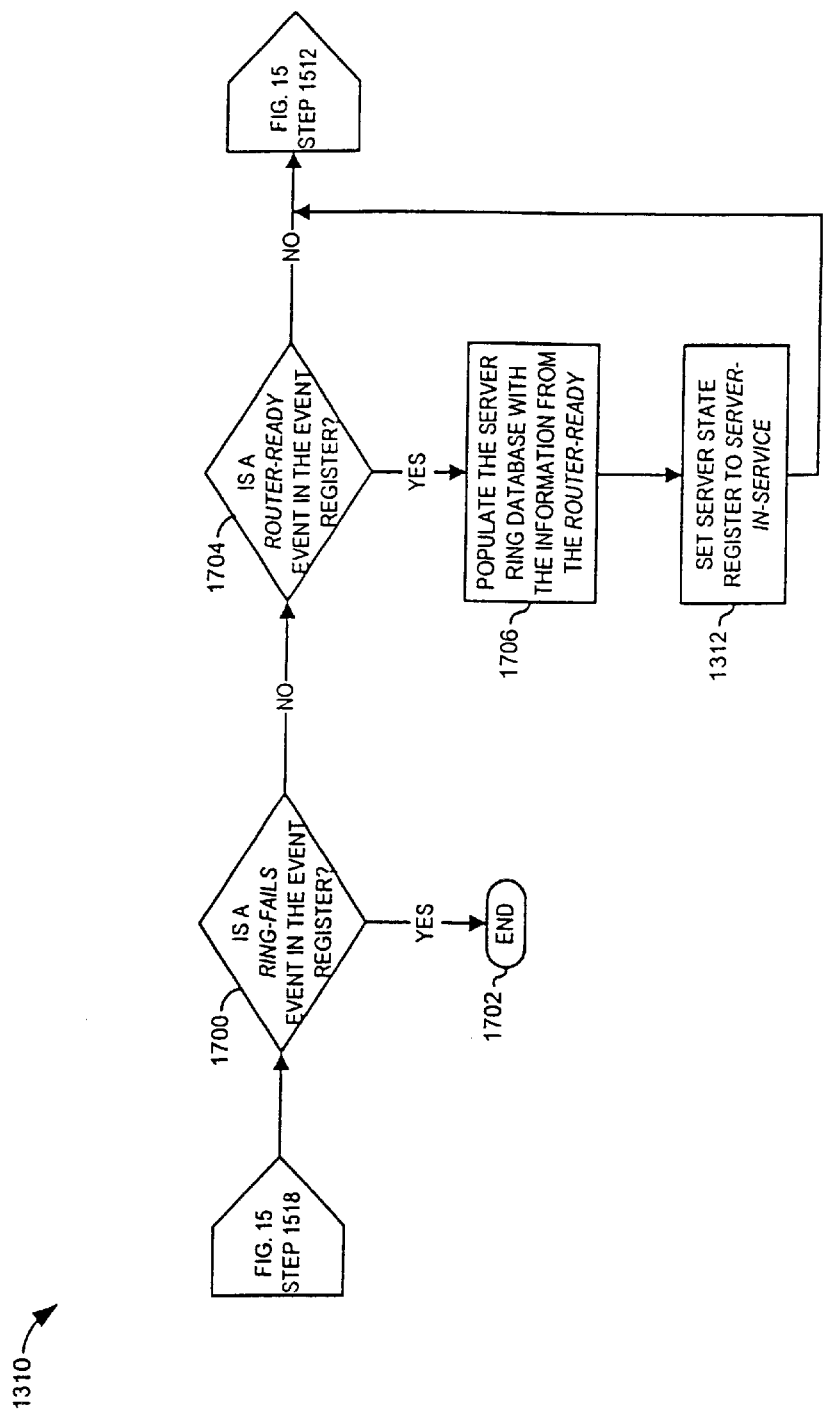
FIG. 17 is a representative event sequence flow diagram for the Totem server of FIG. 1 in a server-waiting-for-ring-ready state.

FIG. 17 depicts the representative operation of the server 124 in the server-waiting-for-router-ready state 1310. Execution proceeds from step 1518 to step 1700 wherein a determination is made whether a ring-fails event 610 is in the server event register 314. If it is determined that a ring-fails event 610 is in the server event register 314, execution proceeds to step 1702 wherein execution is terminated.

If, in step 1700, it is determined that a ring-fails event 600 is not in the server event register 314, execution proceeds to step 1704 wherein a determination is made whether a router-ready event 660 is in the server event register 314. If it is determined that a router-ready event 660 is in the server event register 314, execution proceeds to step 1706 wherein the server ring database 310 is populated with all the rings from the router ready event 660. These are all the rings that the sending router 122 currently has in its remote router database 208 when it sent the message. Execution then proceeds to step 1312 wherein the server state register 312 is set to server-in-service state 1314.

If, in step 1704, it is determined that a router-ready event 660 is not in server event register 314, execution returns to step 1512.

Figure 18:
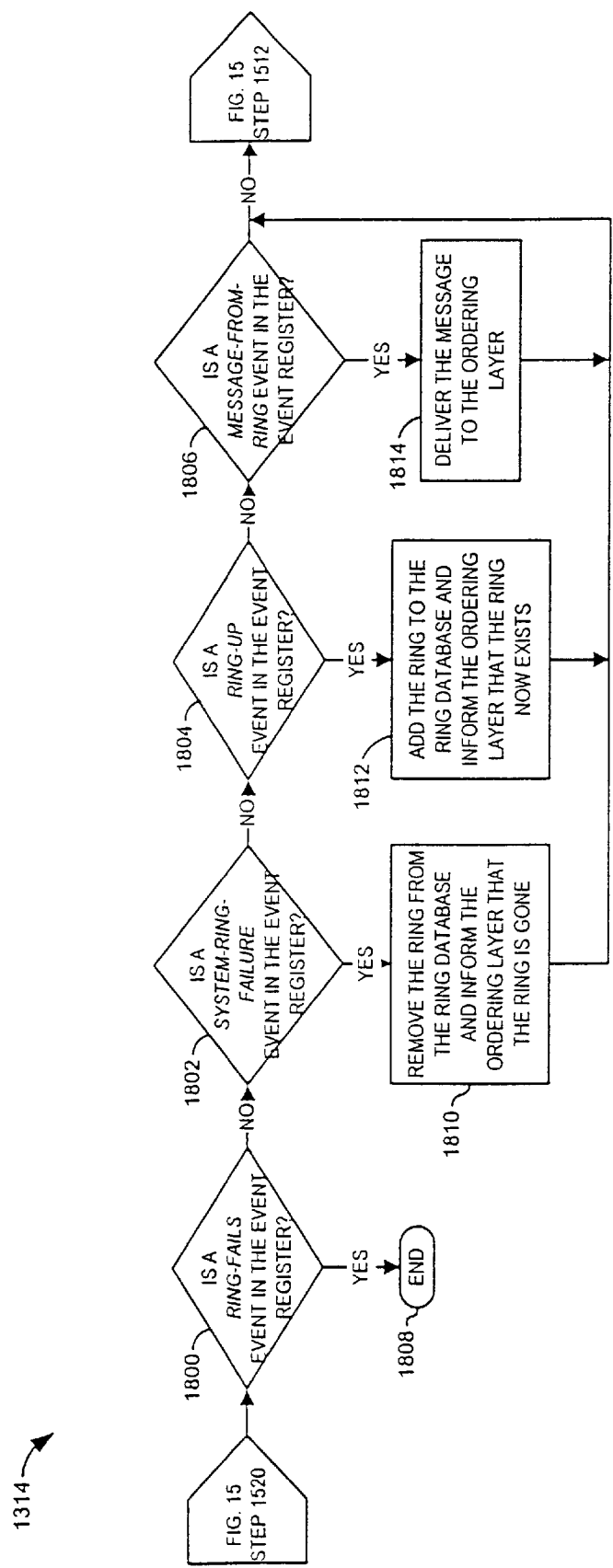
FIG. 18 is a representative event sequence flow diagram. for the Totem server of FIG. 1 in a server-waiting-for-ring-ready state.

FIG. 18 depicts the representative operation of the server 124 in server-in-service state 1314. Execution proceeds from step 1520 to step 1800 wherein a determination is made whether a ring-fails event 610 is in the server event register 314. If it is determined that a ring-fails event 610 is in the server event register 314, execution proceeds to step 1808 wherein execution is terminated.

If, in step 1800, it is determined that a ring-fails event 600 is not in server event register 314, execution proceeds to step 1802 wherein a determination is made whether a system-ring-failure event 662 is in the server event register 314. If it is determined that a system-ring-failure event 662 is in the server event register 314, execution proceeds to step 1810 wherein the ring identified in the system-ring-failure event 662 is removed from the server ring database 310 and the ordering layer 404 is informed of the ring failure so it may proceed ordering according to standard Totem practice. The system-ring-failure event 662 is different from other event because it is delivered in total order per standard Totem practice so that all server in the system will know about the failure at the same time. Execution then returns to step 1512.

If, in step 1802, it is determined that a system-ring-failure event 662 is not in server event register 314, execution proceeds to step 1804 wherein a determination is made whether a ring-up event 656 is in server state register 312. If it is determined that a ring-up event 656 is in the server-event register 312, execution proceeds to step 1812 wherein the ring identified in the ring-up event 656 is added to the server ring database 310 and the ordering layer 404 is informed of the new ring so it may proceed ordering according to standard Totem practice. Execution then returns to step 1512.

If, in step 1804, it is determined that a ring-up event 656 is not in server event register 314, execution proceeds to step 1806 wherein a determination is made whether a message-from-ring event 614 is in server state register 312. If it is determined that a message-from-ring event 614 is in the server-event register 312, execution proceeds to step 1814 wherein the message is delivered to the ordering layer 404 so it may order the message according to standard Totem practice then deliver it to the process it is destined for. Execution then returns to step 1512.

The use of the present invention eliminates unacceptable latency time and resultant error rates between Totem rings which are separated by relatively long geographic distances. Thus, the geographic size, speed, capacity, and utility of Totem networks is significantly increased without experiencing degradations in performance which result from long time latencies.

It is understood that the present invention can take many forms and embodiments. Accordingly, several variations may be made in the foregoing without departing from the spirit or the scope of the invention. For example, the protocol may be extended, and the state machines of both the servers and the routers modified, to provide more functionality. The present invention may also be implemented in systems that do not provide for total order message delivery, and may, for example, be used with virtual synchrony systems that provide for FIFO (first-in-first-out) order, causal order, or the like. The present invention may be implemented without the process group management protocol layer 406 positioned adjacent the operating protocol layer 404; and a process addressing mechanism, such as a conventional point-to-point service, datagram service, or the like, may be utilized in lieu of the process group management protocol layer 406. As discussed above, the present invention may also be operated with or without the collection layer 402. The Totem rings 102 and 104 may be geographically proximate or distant relative to the each other. The present invention may be used on a local virtual synchrony network having properties similar to those of a Totem ring, such as local total order, a common or consolidated timestamp shared by a set of servers and routers, protocols that ensure that all servers and routers receive all messages on the local network, and the like. The present invention may also be practiced wherein all nodes do not receive all the local messages, but wherein the servers understood to send messages to the router when they are not local and still maintain total order. The present invention may also be practiced without a local multicast network. Existing Totem ring networks may also be adapted to implement the present invention, or to join to an existing network a Totem ring configured with a dedicated Totem router in accordance with the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A Totem ring network, comprising:
   a) at least one first Totem ring having at least one first local area network (LAN);
   b) a first router connected to and configured for serving the at least one first LAN;
   c) at least one second Totem ring having at least one second LAN;
   d) a second router connected to and configured for serving the at least one second LAN; and
   e) at least one point-to-point link connected between the first router and the second router for establishing a channel of communication between the at least one first Totem ring and the at least one second Totem ring.

2. The network of claim 1 wherein the first router and the second router each comprise, respectively:
   a) a host processor;
   b) at least one multicast capable network interface interconnected between the host processor and a respective LAN;
   c) at least one point-to-point capable network interface interconnected between the host processor and the at least one link; and
   d) a host memory connected to the host processor.

3. The network of claim 1 wherein the first Totem router and the second Totem router each comprise, respectively:
   a) a host processor;
   b) at least one multicast capable network interface interconnected between the host processor and a respective LAN;
   c) at least one point-to-point capable network interface interconnected between the host processor and the at least one link; and
   d) a host memory connected to the host processor, the host memory being apportioned between at least a remote router database, a LAN database, a state register, and event register, and a timestamp timer.

4. The network of claim 1 further comprising:
   a) at least one first server connected to the at least one first LAN; and
   b) at least one second server connected to the at least one second LAN for communication through the first and second routers with the at least one first server.

5. The network of claim 1 further comprising:
   a) at least one first server connected to the at least one first LAN;
   b) means for joining the at least one first server to the at least one first router;
   c) at least one second server connected to the at least one second router; and
   d) means for joining the at least one second server to the at least one second router, to thereby establish a communication channel between the first and second server.

6. The network of claim 1 further comprising:
   a) at least one first server connected to the at least one first LAN; and
   b) at least one second server connected to the at least one second LAN for communication through the first and second routers with the at least one first server;
   wherein each of the first and second servers respectively comprises:
      a host processor;
      at least one multicast capable network interface interconnected between the host processor and a respective LAN; and
      a host memory connected to the host processor.

7. The network of claim 1 further comprising:
   a) at least one first server connected to the at least one first LAN; and
   b) at least one second server connected to the at least one second LAN for communication through the first and second routers with the at least one first server;
   wherein each of the first and second servers respectively comprises:
      a host processor;
      at least one multicast capable network interface interconnected between the host processor and a respective LAN; and
      a host memory connected to the host processor, the host memory being apportioned between at least a server ring database, a server state register, and a server event register.

8. The network of claim 1 wherein the at least one link is one of a communications network or a wide area network (WAN).

9. The network of claim 1 wherein the Totem network is interconnected with a distributed network.

10. The network of claim 1 further comprising means for transmitting totally ordered messages between the at least one first Totem ring and the at least one second Totem ring.

11. The network of claim 1 wherein the first Totem router is configured to distribute multicast messages between at least one first Totem ring and the at least one second Totem ring.

12. The network of claim 1 wherein the first router and second router further comprise complementary computer program code executable for joining the first router to the second router.

13. The network of claim 1 wherein the first router and the second router further comprise complementary computer programs executable for joining the first router to the second router, each of which computer programs respectively comprises:
   a) computer program code for entering the first router into a router-initialization state;
   b) computer program code for determining when the first router has been initialized;
   c) computer program code for entering the first router into a router-waiting-for-ring-ready state upon a determination that the first router has been initialized;
   d) computer program code for determining when the first router has received a ring-ready signal;
   e) computer program code for entering the router into a router-waiting-for-remote-router-info state upon a determination that the router has received a ring-ready signal;
   f) computer program code for determining when the router has received remote-router-information; and
   g) computer program code for entering the router into a router-in-service state upon a determination that the router has received remote-router-information.

14. The network of claim 1 wherein the first router and the second router further comprise complementary computer programs executable for joining the at least one first router to the at least one second router, each of which computer programs respectively comprises:
   a) computer program code residing on the ordering layer of the first router for sending an enable-ring signal from the ordering layer of the first router to a Totem ring layer of the first router;
   b) computer program code residing on the first router for sending a connect message from the first router to the second router;
   c) computer program code residing on the Totem ring layer of the first router for sending, in response to receipt of the enable-ring signal, a ring-comes-up signal from the Totem ring layer of the first router to the ordering layer of first router;
   d) computer program code residing on the second router for sending, in response to receipt of the connect message, a connect-ack-from-remote-router message from the second router to the first router;
   e) computer program code residing on the first router for sending a ring-up message from the first router to the second router; and
   f) computer program code for sending a remote-ring-up-from-remote-router message from the second router to the first router.

15. The network of claim 1 further comprising at least one server connected to the at least one first LAN, and through the at least one first LAN to the first router; and wherein the at least one server and the first router further comprise complementary computer program code executable for joining the at least one server to the first router.

16. The network of claim 1 further comprising at least one server connected to the at least one first LAN, and through the at least one first LAN to the first router; and wherein the at least one server and the first router further comprise complementary computer program code executable for joining the at least one server to the first router, each of which computer programs respectively comprises:
   a) computer program code for entering the at least one server into a server-initialization state;
   b) computer program code for determining when the server has been initialized;
   c) computer program code for entering the at least one server into a server-waiting-for-ring-ready state upon a determination that the at least one server has been initialized;
   d) computer program code for determining when the at least one server has received a ring-ready signal;
   e) computer program code for entering the at least one server into a server-waiting-for-router-ready state upon a determination that the at least one server has received a ring-ready signal;
   f) computer program code for determining when the at least one server has received a remote-router-ready message; and
   g) computer program code for entering the at least one server into a server-in-service state upon a determination that the at least one server has received a router-ready message.

17. The network of claim 1 further comprising at least one server connected to the at least one first LAN, and through the at least one first LAN to the first router; and wherein the at least one server and the first router further comprise complementary computer program code executable for joining the at least one server to the first router, each of which computer programs respectively comprises:
   a) computer program code residing on the at least one server for sending an enable-ring message from the at least one server to the first router;
   b) computer program code residing on the first router for sending, in response to receipt of the enable-ring message, a ring-comes-up message from the first router to the server;
   c) computer program code residing on the at least one server for sending a router-ready-request-from-ring message from the at least one server to the first router; and
   d) computer program code residing on the first router for sending, in response to receipt of the router-ready-request-from-ring message, a router-ready message from the second router to the first router.

18. A method for connecting a first Totem ring having at least one first local area network (LAN) to a second Totem ring having at least one second LAN, comprising the following steps:
   a) configuring a first router for serving the at least one first LAN;
   b) configuring a second router for serving the at least one second LAN; and
   c) linking the first router to the second router for establishing a channel of communication between the at least one first Totem ring and the at least one second Totem ring.

19. The method of claim 18 wherein the step of configuring a first router for serving the at least one first LAN further comprises connecting at least one multicast capable network interface between a host processor of the first router and the at least one first LAN; and the step of configuring a second router for serving the at least one second LAN further comprises connecting at least one multicast capable network interface between a host processor of the second router and the at least one second LAN.

20. The method of claim 18 wherein the step of linking further comprises connecting at least one point-to-point capable network interface between a host processor of the first router and a host processor of the second router.

21. The method of claim 18 further comprising the steps of:
   a) connecting at least one first server to the at least one first LAN; and
   b) connecting at least one second server to the at least one second LAN for communication through the first and second routers with the at least one first server.

22. The method of claim 18 further comprising:
   a) connecting at least one first server to the at least one first LAN;
   b) joining the at least one first server to the at least one first router;
   c) connecting at least one second server to the at least one second router; and
   d) joining the at least one second server to the at least one second router, to thereby establish a communication channel between the first and second server.

23. The method of claim 18 further comprising:
   a) connecting a host processor of at least one first server through at least one first multicast capable network interface to the at least one first LAN;
   b) joining the at least one first server to the at least one first router;
   c) connecting a host processor of at least one second server through at least one second multicast capable network interface to the at least one second router; and
   d) joining the at least one second server to the at least one second router, to thereby establish a communication channel between the first and second server.

24. The method of claim 18 wherein the step of linking further comprises linking the first router to the second router through one of a communications network or a wide area network (WAN) for establishing a channel of communication between the at least one first Totem ring and the at least one second Totem ring.

25. The method of claim 18 further comprising interconnecting the at least one first Totem router and the at least one second Totem router with a distributed network.

26. The method of claim 18 further comprising transmitting totally ordered messages between the at least one first Totem ring and the at least one second Totem ring.

27. The method of claim 18 further comprising configuring the first Totem router and the second Totem router to distribute multicast messages between the at least one first Totem ring and the at least one second Totem ring.

28. The method of claim 18 wherein the step of linking further comprises executing computer program code for joining the first router to the second router.

29. The method of claim 18 wherein the step of linking further comprises executing computer program code for joining the first router to the second router, wherein the step of executing computer program code comprises the steps of:
   a) entering the first router into a router-initialization state;
   b) determining when the first router has been initialized;
   c) entering the first router into a router-waiting-for-ring-ready state upon a determination that the first router has been initialized;
   d) determining when the first router has received a ring-ready signal;
   e) entering the router into a router-waiting-for-remote-router-info state upon a determination that the router has received a ring-ready signal;
   f) determining when the router has received remote-router-information; and
   g) entering the router into a router-in-service state upon a determination that the router has received remote-router-information.

30. The method of claim 18 wherein the step of linking further comprises executing computer program code for joining the first router to the second router, wherein the step of executing computer program code comprises the steps of:
   a) sending an enable-ring signal from the ordering layer of the first router to a Totem ring layer of the first router;
   b) sending a connect message from the first router to the second router;
   c) sending, in response to receipt of the enable-ring signal, a ring-comes-up signal from the Totem ring layer of the first router to the ordering layer of first router;
   d) sending, in response to receipt of the connect message, a connect-ack-from-remote-router message from the second router to the first router;
   e) sending a ring-up message from the first router to the second router; and
   f) sending a remote-ring-up-from-remote-router message from the second router to the first router.

31. The method of claim 18 further comprising connecting at least one server to the at least one first LAN, and through the at least one first LAN to the first router; and executing computer program code for joining the at least one server to the first router.

32. The method of claim 18 further comprising connecting the at least one server to the at least one first LAN, and through the at least one first LAN to the first router; and executing computer program code for joining the at least one server to the first router, wherein the step of joining further comprises:
   a) entering the at least one server into a server-initialization state;
   b) determining when the server has been initialized;
   c) entering the at least one server into a server-waiting-for-ring-ready state upon a determination that the at least one server has been initialized;
   d) determining when the at least one server has received a ring-ready signal;
   e) entering the at least one server into a server-waiting-for-router-ready state upon a determination that the at least one server has received a ring-ready signal;
   f) determining when the at least one server has received a remote-router-ready message; and
   g) entering the at least one server into a server-in-service state upon a determination that the at least one server has received a router-ready message.

33. The method of claim 18 further comprising connecting the at least one server to the at least one first LAN, and through the at least one first LAN to the first router; and executing computer program code for joining the at least one server to the first router, wherein the step of joining further comprises:

a) sending an enable-ring message from the at least one server to the first router;

b) sending, in response to receipt of the enable-ring message, a ring-comes-up message from the first router to the server;

c) sending a router-ready-request-from-ring message from the at least one server to the first router; and d) sending, in response to receipt of the router-ready-request-from-ring message, a router-ready message from the second router to the first router.

34. A first Totem ring, comprising:

a) at least one local area network (LAN);

b) a first router connected to the at least one LAN and configured for serving the at least one first Totem ring, the first router being connectable to a second router of at least one second Totem ring; and c) computer program code residing within the at least one router, the computer program code being executable for joining the first router of the first Totem ring to second router of the at least one second Totem ring.

35. The Totem ring of claim 34 wherein the first router comprises:

a) a host processor;

b) at least one multicast capable network interface interconnected between the host processor and the at least one LAN;

c) at least one point-to-point capable network interface connected to the host processor and connectable to the at least one second Totem ring; and d) a host memory connected to the host processor.

36. The Totem ring of claim 34 wherein the first router comprises:

a) a host processor;

b) at least one multicast capable network interface interconnected between the host processor and the at least one LAN;

c) at least one point-to-point capable network interface connected to the host processor and connectable to the at least one second Totem ring; and d) a host memory connected to the host processor, the host memory being apportioned between at least a remote router database, a LAN database, a state register, and event register, and a timestamp timer.

37. The Totem ring of claim 34 further comprising at least one first server connected to the at least one LAN for communication through the first router with the at least one second router.

38. The Totem ring of claim 34 further comprising:

a) at least one first server connected to the at least one first LAN;

b) means for joining the at least one first server to the at least one first router; and c) means for joining the at least one second server to at least one second router, to thereby establish a communication channel between the first server and a second server.

39. The Totem ring of claim 34 further comprising at least one first server connected to the at least one first LAN, wherein the first server comprises:

a) a host processor;

b) at least one multicast capable network interface interconnected between the host processor and the LAN; and c) a host memory connected to the host processor.

40. The Totem ring of claim 34 further comprising at least one first server connected to the at least one first LAN, wherein the first server comprises:

a) a host processor;

b) at least one multicast capable network interface interconnected between the host processor and the LAN; and c) a host memory connected to the host processor, the host memory being apportioned between at least a server ring database, a server state register, and a server event register.

41. The Totem ring of claim 34 wherein the router is connectable through one of a communications network or a wide area network (WAN) to at least one second Totem ring.

42. The Totem ring of claim 34 wherein the Totem ring is connectable to a distributed network.

43. The Totem ring of claim 34 further comprising means for transmitting totally ordered messages between the at least one first Totem ring and the at least one second Totem ring.

44. The Totem ring of claim 34 wherein the first router is configured to distribute multicast messages.

45. The Totem ring of claim 34 wherein the first router further comprises computer program code executable for joining the first router to a second router of the at least one second router.

46. The Totem ring of claim 34 wherein the router comprises computer program code executable for joining the first router to a second router, said computer program code comprising:

a) computer program code for entering the first router into a router-initialization state;

b) computer program code for determining when the first router has been initialized;

c) computer program code for entering the first router into a router-waiting-for-ring-ready state upon a determination that the first router has been initialized;

d) computer program code for determining when the router has received a ring-ready signal;

e) computer program code for entering the router into a router-waiting-for-remote-router-info state upon a determination that the router has received a ring-ready signal;

f) computer program code for determining when the router has received remote-router-information; and g) computer program code for entering the router into a router-in-service state upon a determination that the router has received remote-router-information.

47. The Totem ring of claim 34 wherein the router further comprises computer program code executable for joining the at least one first router to at least one second router, said computer program comprising:

a) computer program code residing on the ordering layer of the first router for sending an enable-ring signal from the ordering layer of the first router to a Totem ring layer of the first router;

b) computer program code residing on the first router for sending a connect message from the first router to the second router;

c) computer program code residing on the Totem ring layer of the first router for sending, in response to receipt of the enable-ring signal, a ring-comes-up signal from the Totem ring layer of the first router to the ordering layer of first router;

d) computer program code residing on the second router for sending, in response to receipt of the connect message, a connect-ack-from-remote-router message from the second router to the first router;

e) computer program code residing on the first router for sending a ring-up message from the first router to the second router; and f) computer program code for sending a remote-ring-up-from-remote-router message from the second router to the first router.

48. The Totem ring of claim 34 further comprising at least one server connected to the at least one first LAN, and through the at least one first LAN to the first router; and wherein the at least one server and the first router further comprise complementary computer program code executable for joining the at least one server to the first router.

49. The Totem ring of claim 34 further comprising at least one server connected to the at least one first LAN, and through the at least one first LAN to the first router; and wherein the at least one server and the first router further comprise complementary computer program code executable for joining the at least one server to the first router, each of which computer programs respectively comprises:

a) computer program code for entering the at least one server into a server-initialization state;

b) computer program code for determining when the server has been initialized;

c) computer program code for entering the at least one server into a server-waiting-for-ring-ready state upon a determination that the at least one server has been initialized;

d) computer program code for determining when the at least one server has received a ring-ready signal;

e) computer program code for entering the at least one server into a server-waiting-for-router-ready state upon a determination that the at least one server has received a ring-ready signal;

f) computer program code for determining when the at least one server has received a remote-router-ready message; and g) computer program code for entering the at least one server into a server-in-service state upon a determination that the at least one server has received a router-ready message.

50. The Totem ring of claim 34 further comprising at least one server connected to the at least one first LAN, and through the at least one first LAN to the first router; and wherein the at least one server and the first router further comprise complementary computer program code executable for joining the at least one server to the first router, each of which computer programs respectively comprises:

a) computer program code residing on the at least one server for sending an enable-ring message from the at least one server to the first router;

b) computer program code residing on the first router for sending, in response to receipt of the enable-ring message, a ring-comes-up message from the first router to the server;

c) computer program code residing on the at least one server for sending a router-ready-request-from-ring message from the at least one server to the first router; and d) computer program code residing on the first router for sending, in response to receipt of the router-ready-request-from-ring message, a router-ready message from the second router to the first router.

51. A computer program product for joining a first router of a first Totem ring to a second router of a second Totem ring, the computer program product having a medium with a computer program embodied thereon, the computer program comprising:

a) computer program code for entering the first router into a router-initialization state;

b) computer program code for determining when the first router has been initialized;

c) computer program code for entering the first router into a router-waiting-for-ring-ready state upon a determination that the first router has been initialized;

d) computer program code for determining when the router has received a ring-ready signal;

e) computer program code for entering the router into a router-waiting-for-remote-router-info state upon a determination that the router has received a ring-ready signal;

f) computer program code for determining when the router has received remote-router-information; and g) computer program code for entering the router into a router-in-service state upon a determination that the router has received remote-router-information.

52. A computer program product for joining a first router of a first Totem ring to a second router of a second Totem ring, the computer program product having a medium with a computer program embodied thereon, the computer program comprising:

a) computer program code residing on the ordering layer of the first router for sending an enable-ring signal from the ordering layer of the first router to a Totem ring layer of the first router;

b) computer program code residing on the first router for sending a connect message from the first router to the second router;

c) computer program code residing on the Totem ring layer of the first router for sending, in response to receipt of the enable-ring signal, a ring-comes-up signal from the Totem ring layer of the first router to the ordering layer of first router;

d) computer program code residing on the second router for sending, in response to receipt of the connect message, a connect-ack-from-remote-router message from the second router to the first router;

e) computer program code residing on the first router for sending a ring-up message from the first router to the second router; and f) computer program code for sending a remote-ring-up-from-remote-router message from the second router to the first router.

53. A first Totem router comprising:

a) a host processor;

b) at least one first interface connected to the host processor and connectable to a local area network (LAN) of a first Totem ring;

c) at. least one point-to-point capable network interface connected to the host processor and connectable through at least one point-to-point link to a second Totem router of a second Totem ring; and d) a host memory connected to the host processor.

54. The first Totem router of claim 53 wherein the at least one point-to-point link comprises one of a communications network or a wide area network (WAN).

55. The first Totem router of claim 53 further comprising a computer program product having a medium with a computer program embodied thereon, the computer program comprising computer program code executable for joining the first Totem router to the second Totem router.

56. The first Totem router of claim 53 further comprising a computer program product having a medium with a computer program embodied thereon, the computer program comprising computer program code executable for joining the first Totem router to the second Totem router, the computer program comprising:
   a) computer program code for entering the first router into a router-initialization state;
   b) computer program code for determining when the first router has been initialized;
   c) computer program code for entering the first router into a router-waiting-for-ring-ready state upon a determination that the first router has been initialized;
   d) computer program code for determining when the first router has received a ring-ready signal;
   e) computer program code for entering the router into a router-waiting-for-remote-router-info state upon a determination that the router has received a ring-ready signal;
   f) computer program code for determining when the router has received remote-router-information; and
   g) computer program code for entering the router into a router-in-service state upon a determination that the router has received remote-router-information.

57. The first Totem router of claim 53 further comprising a computer program product having a medium with a computer program embodied thereon, the computer program comprising computer program code executable for joining the first Totem router to the second Totem router, the computer program comprising:
   a) computer program code residing on an ordering layer of the first Totem router for sending an enable-ring signal from the ordering layer of the first Totem router to a Totem ring layer of the first router;
   b) computer program code residing on the first router for sending a connect message from the first Totem router to the second Totem router;
   c) computer program code residing on the Totem ring layer of the first router for sending, in response to receipt of the enable-ring signal, a ring-comes-up signal from the Totem ring layer of the first router to the ordering layer of first router; and
   d) computer program code residing on the first router for sending a ring-up message from the first router to the second router.

58. The first Totem router of claim 53 wherein the at least one first interface comprises at least one multicast capable network interface.

59. The first Totem router of claim 53 wherein the host processor further comprises:
   a) a remote router database;
   b) a LAN database;
   c) a state register;
   d) event register; and
   e) a timestamp timer.

* * * * *

UNITED STATES PATENT AND TRADEMARK OFFICE
CERTIFICATE OF CORRECTION

PATENT NO.    : 6,647,430 B1  
DATED         : November 11, 2003  
INVENTOR(S)   : Trenton Corey Minyard and Gregory T. Stovall It is certified that error appears in the above-identified patent and that said Letters Patent is hereby corrected as shown below:

Title page,
Item [56], References Cited, OTHER PUBLICATIONS, "FDDI…" reference, replace with -- FDDI, www.pmg,com/otw_nwsl/97_sm fddi.htm --.
"ATM…" reference, replace with -- ATM and ISO-OSI Reference Model, www.usc.edu/dept/engineering/eleceng/Adv_Network_Tech/Html/telco/sld022.htm --.

Column 5,
Line 4, after the word "LAN" delete "."

Column 7,
Line 45, after the words "(i.e., activated)" insert -- . --

Column 8,
Line 8, delete "as" and insert -- has --

Column 9,
Line 50, delete the hard return between the words "process" and "messages"

Column 15,
Line 16, delete "11" and insert -- 11C --

Signed and Sealed this

Twenty-fifth Day of May, 2004

JON W. DUDAS  
*Acting Director of the United States Patent and Trademark Office*